US010197672B2

(12) United States Patent
Takahashi et al.

(10) Patent No.: US 10,197,672 B2
(45) Date of Patent: Feb. 5, 2019

(54) MOVING OBJECT DETECTION APPARATUS AND DRIVE SUPPORT APPARATUS

(71) Applicant: Toyota Jidosha Kabushiki Kaisha, Toyota-shi, Aichi-ken (JP)

(72) Inventors: Yoshihiko Takahashi, Miyoshi (JP); Yoichi Iwata, Nagoya (JP); Motonari Ohbayashi, Nagakute (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 195 days.

(21) Appl. No.: 15/188,563

(22) Filed: Jun. 21, 2016

(65) Prior Publication Data
US 2017/0031018 A1  Feb. 2, 2017

(30) Foreign Application Priority Data

Jul. 27, 2015 (JP) ................. 2015-148042

(51) Int. Cl.
G01S 7/40 (2006.01)
G01S 13/93 (2006.01)

(52) U.S. Cl.
CPC ..... G01S 13/931 (2013.01); G01S 2007/4039 (2013.01); G01S 2013/9317 (2013.01);
(Continued)

(58) Field of Classification Search
CPC ........... G01S 13/931; G01S 2007/4039; G01S 2013/9317; G01S 2013/9346;
(Continued)

(56) References Cited

U.S. PATENT DOCUMENTS 5,565,870 A * 10/1996 Fukuhara .............. G01S 7/2926
                                                    342/70
6,487,369 B1 * 11/2002 Sato ........................ G03B 17/00
                                                    396/52
(Continued)

FOREIGN PATENT DOCUMENTS

EP       2359917 A1 *  8/2011  ............. A63F 13/44
JP    2007-279892 A    10/2007
(Continued)

Primary Examiner — Timothy A Brainard
Assistant Examiner — Nuzhat Pervin
(74) Attorney, Agent, or Firm — Dinsmore & Shohl LLP

(57) ABSTRACT

A moving object detection apparatus is configured to calculate, based on detection information of an object from a radar sensor, a moving direction of the object with respect to a host vehicle to generate object information, the object information including information representing the calculated moving direction; set an invalidation time period or an invalidation section; and prevent a calculation of the moving direction during a period from the detection start timing to an invalidation end timing, the invalidation end timing being at a lapse of the invalidation time period or a timing when the object exists from the invalidation section, or prevent the moving direction calculated by the object information generating part from being used in a drive support control during the period from the detection start timing to the invalidation end timing.

5 Claims, 17 Drawing Sheets

(52) U.S. Cl.
CPC ............. *G01S 2013/9346* (2013.01); *G01S 2013/9378* (2013.01)

(58) Field of Classification Search
CPC ........... G01S 2013/9378; G01S 7/2926; G01S 7/023; G08G 1/166; G08G 1/165; G08G 1/096716; G03B 17/00; A63F 13/44; B60Q 9/006; B62C 15/027; B62D 15/027; B60K 31/008
USPC .......................................................... 342/71
See application file for complete search history.

(56) References Cited

U.S. PATENT DOCUMENTS

| | | | | |
|---|---|---|---|---|
| 6,889,161 | B2* | 5/2005 | Winner | B60K 31/0008 |
| | | | | 701/93 |
| 6,894,641 | B2* | 5/2005 | Uehara | G01S 7/023 |
| | | | | 342/104 |
| 7,230,524 | B2* | 6/2007 | Watanabe | B62D 15/027 |
| | | | | 340/435 |
| 7,385,486 | B2* | 6/2008 | Danz | B60Q 9/006 |
| | | | | 340/435 |
| 2010/0169015 | A1* | 7/2010 | Tsunekawa | G08G 1/165 |
| | | | | 701/300 |
| 2010/0271238 | A1* | 10/2010 | Reed | G01S 13/931 |
| | | | | 340/932.2 |
| 2011/0093178 | A1* | 4/2011 | Yamada | G08G 1/096716 |
| | | | | 701/70 |
| 2011/0183765 | A1* | 7/2011 | Kobayashi | A63F 13/44 |
| | | | | 463/43 |
| 2011/0187582 | A1* | 8/2011 | Tsunekawa | G08G 1/166 |
| | | | | 342/107 |
| 2014/0121938 | A1* | 5/2014 | Takahashi | G08G 1/166 |
| | | | | 701/101 |

FOREIGN PATENT DOCUMENTS

| | | | | |
|---|---|---|---|---|
| JP | 2007279892 A | * | 10/2007 | ............ B60R 21/00 |
| JP | 2008137396 A | * | 6/2008 | ............ B60R 21/00 |
| JP | 2008137396 A | | 6/2008 | |
| JP | 2009-059082 A | | 3/2009 | |
| JP | 2009059082 A | * | 3/2009 | ............ G08G 1/166 |
| JP | 2010-156567 A | | 7/2010 | |
| JP | 2012-247829 A | | 12/2012 | |
| JP | 2013-045142 A | | 3/2013 | |
| WO | 2010064283 A1 | | 6/2010 | |
| WO | 20130027259 A1 | | 2/2013 | |

* cited by examiner

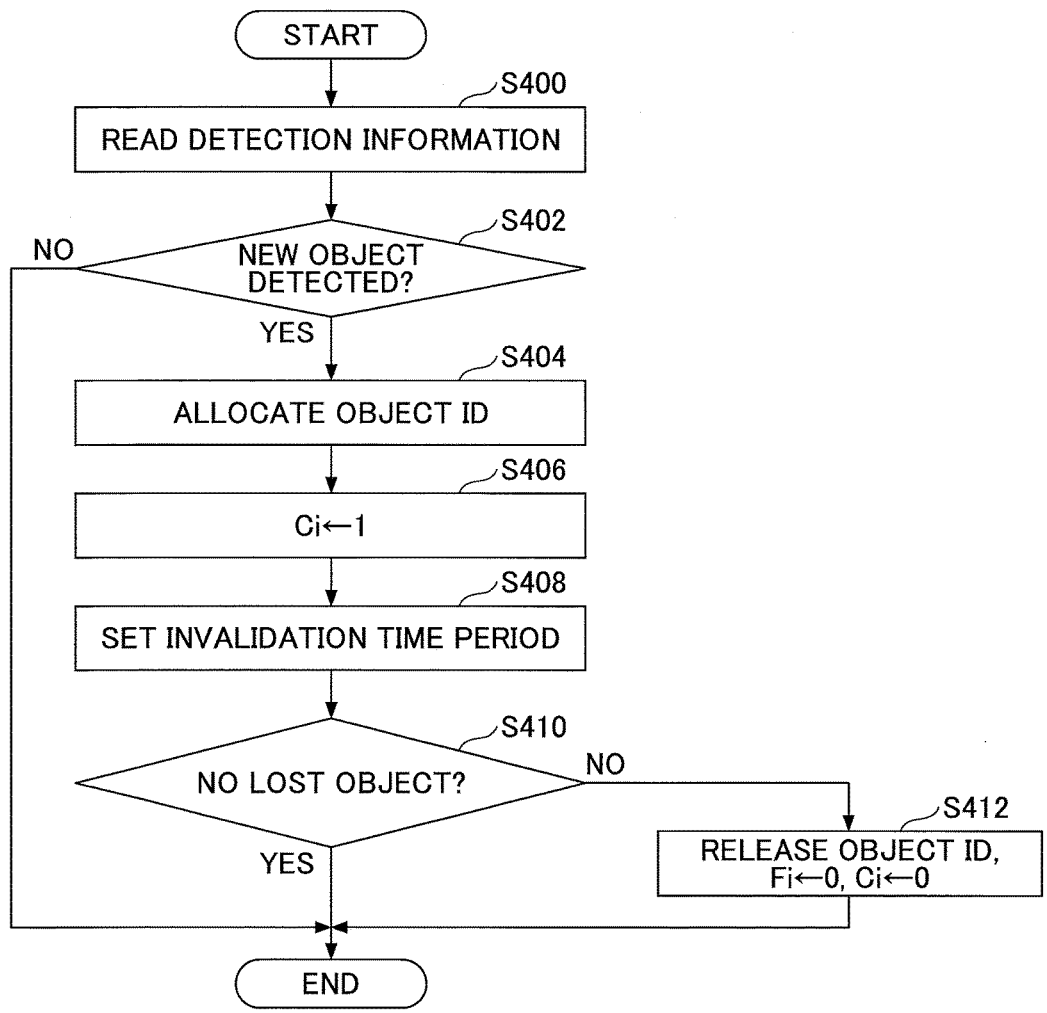

MOVING OBJECT DETECTION APPARATUS AND DRIVE SUPPORT APPARATUS

CROSS REFERENCE TO RELATED APPLICATION

The present application is based on and claims the benefit of priority of Japanese Priority Application No. 2015-148042, filed on Jul. 27, 2015, the entire contents of which are hereby incorporated by reference.

FIELD

This disclosure is related to a moving object detection apparatus and a drive support apparatus.

BACKGROUND

Japanese Laid-open Patent Publication No. 2013-45142 discloses an apparatus installed in a vehicle having a radar sensor on a rear portion thereof. The disclosed apparatus performs drive support control for reducing a probability of a collision between a host vehicle and a monitoring object passing behind the host vehicle from a left side thereof to a right side thereof or from the right side thereof to the left side thereof.

However, with respect to the drive support control as described above, accuracy of calculation based on the detection result of the radar sensor after an object is started to be detected may lead to a problem. This is because a probability that a position of a reflection point that defines a distance between the radar sensor and the object does not correspond to a position of a portion of the object that actually defines the minimum distance with respect to the radar sensor. Thus, during a period in which the reflection point (among possibly a plurality of reflection points on the object) that defines the distance between the radar sensor and the object moves on the object, after the object is started to be detected by the radar sensor, a moving direction of the object calculated based on the detection information of the object from the radar sensor may have an error with respect to an actual moving direction of an approaching vehicle.

Such a problem also occurs in a case of drive support control, in a vehicle having a radar sensor on a front portion thereof, for reducing a probability of a collision between the host vehicle and a monitoring object passing before the host vehicle from a left side thereof to a right side thereof or from the right side thereof to the left side thereof.

Therefore, an object of the disclosure is to at least partially reduce the problem described above.

SUMMARY

According to an aspect of the present disclosure, a moving object detection apparatus is provided. The moving object detection apparatus is provided on a vehicle, the vehicle including a radar sensor on a front or rear portion thereof and a drive support control apparatus configured to perform a drive support control for reducing a probability of a collision between a host vehicle and a monitoring object passing behind the host vehicle from a left side thereof to a right side thereof or from the right side thereof to the left side thereof, the moving object detection apparatus generating, based on detection information of the radar sensor, object information used in the drive support control, the moving object detection apparatus comprising circuitry configured to: calculate, based on detection information of an object from the radar sensor, a moving direction of the object with respect to the host vehicle to generate the object information, the object information including the information representing the calculated moving direction;

set an invalidation time period from a detection start timing when the object is started to be detected by the radar sensor, or an invalidation section from a position of the vehicle at the detection start timing such that the invalidation time period and the invalidation section becomes longer when a detection start distance is a first value than when the detection start distance is a second value that is smaller than a first value, the detection start distance corresponding to a distance between the host vehicle and the object at the detection start timing; and prevent a calculation of the moving direction during a period from the detection start timing to an invalidation end timing, the invalidation end timing being at a lapse of the invalidation time period or a timing when the object exists from the invalidation section, or prevent the calculated moving direction from being used as the moving direction of the monitoring object in the drive support control during the period from the detection start timing to the invalidation end timing.

BRIEF DESCRIPTION OF DRAWINGS

FIG. 4 is a flowchart illustrating an example of an invalidation time period setting process of step S302 in FIG. 3.

FIG. 5 is a diagram illustrating an example of stored information that defines a relationship between an invalidation time period, a detection start distance, and a detection start relative speed.

DESCRIPTION OF EMBODIMENTS

In the following, the best mode for carrying out the present disclosure will be described in detail by referring to the accompanying drawings.

Figure 1:
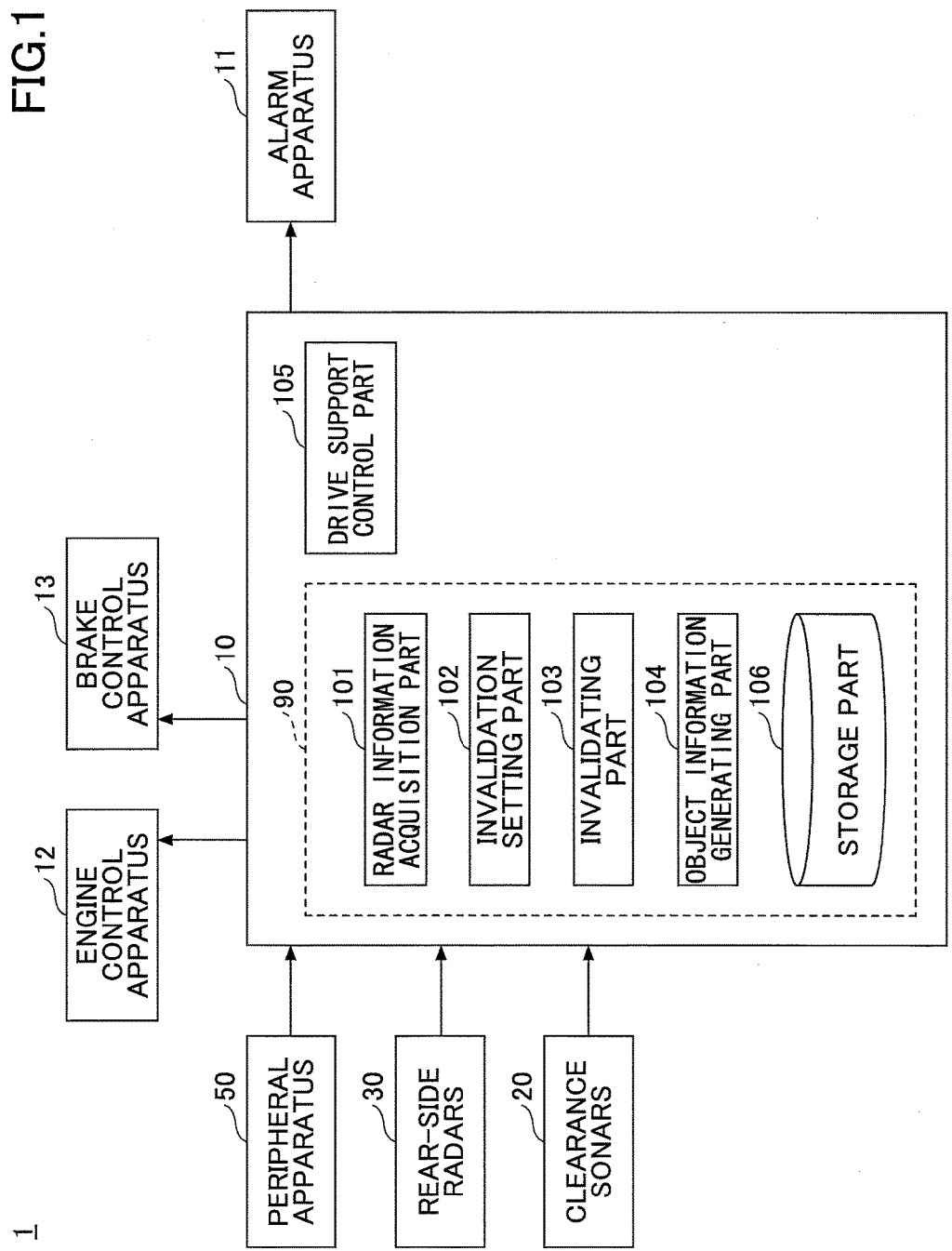
FIG. 1 is a diagram schematically illustrating an example of a configuration of a vehicle system related to a drive support apparatus according to an embodiment.
Figure 2:
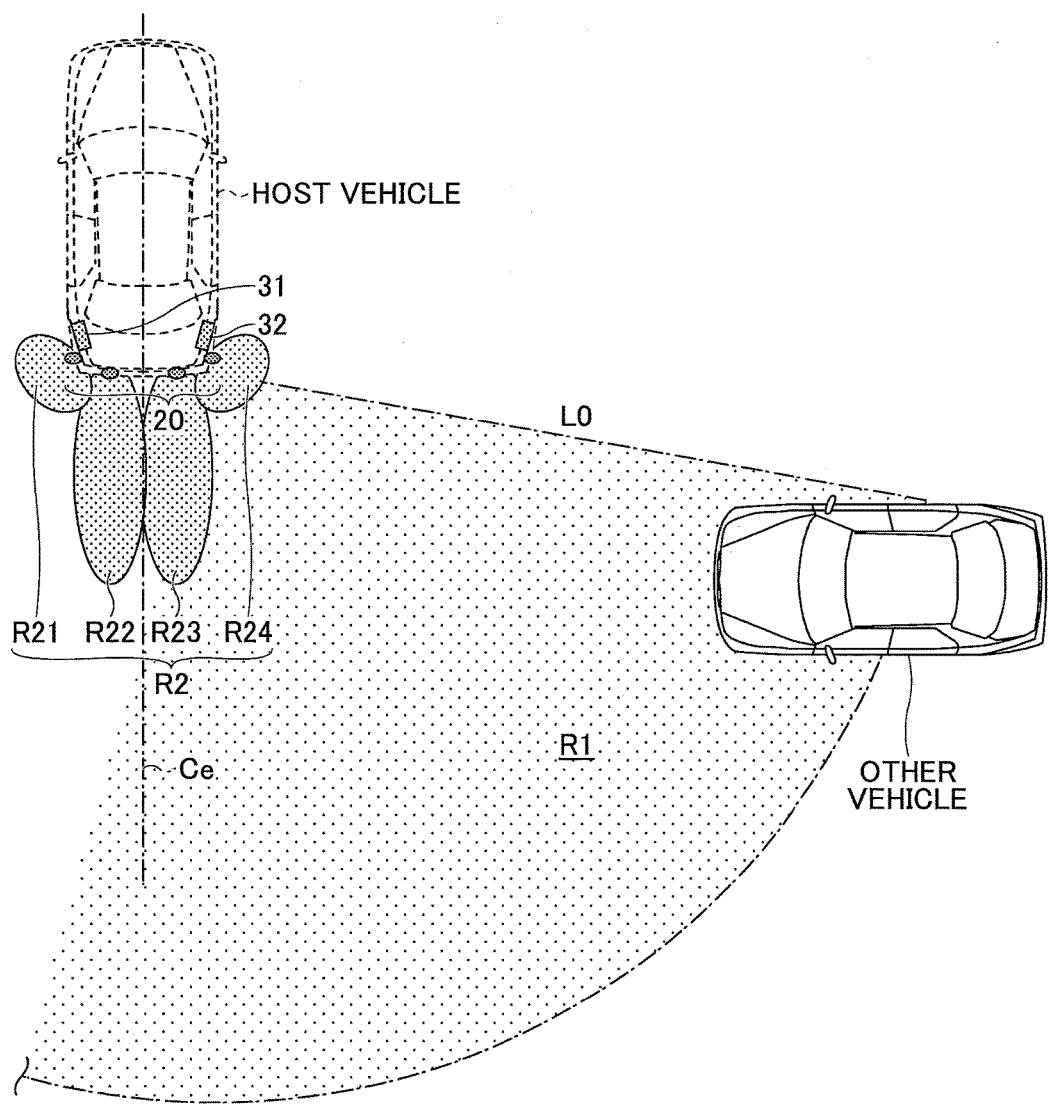
FIG. 2 is a diagram schematically illustrating an example of detection areas of a rear-side radar and a clearance sonar.

FIG. 1 is a diagram schematically illustrating an example of a configuration of a vehicle system related to a drive support apparatus according to an embodiment. FIG. 2 is a diagram schematically illustrating an example of detection areas of a rear-side radar 30 and a clearance sonar 20.

In the following, unless otherwise specified, "side" is defined based on a left and right direction of the host vehicle, and represents a region on a left or right side that is outward with respect to a left end or right end of the host vehicle. The left and right direction is defined based on a view of a driver in a cabin. Similarly, unless otherwise specified, "rear side" is defined based on a longitudinal direction of the host vehicle, and represents a region on a rear side of the host vehicle and behind a rear end of the host vehicle. An expression "rear side" has a concept that covers not only a range that does not extend beyond the whole length of the host vehicle in the left and right direction but also a range that extends beyond the whole length of the host vehicle. In the following, there may be a case where an expression "rear-side" is used to represent the region that also includes the region beyond the whole length of the host vehicle in the left and right direction, in particular. It is noted that the host vehicle represents a vehicle on which a vehicle system 1 is installed.

The vehicle system 1 includes a processing device 10, an alarm apparatus 11, an engine control apparatus 12, a brake control apparatus 13, clearance sonars 20, rear-side radar sensors 30 (merely referred to as "rear-side radars 30", hereinafter), and a peripheral apparatus 50. These components are coupled via a CAN (controller area network), etc., as illustrated in FIG. 1. It is noted that, in the vehicle system 1 illustrated in FIG. 1, the rear-side radars 30 and the processing device 10 are included in an example of a drive support apparatus.

The processing device 10 includes a computer that includes a CPU (Central Processing Unit), a main storage (ROM: Read-Only Memory, RAM: Random Access Memory, for example), an auxiliary storage (EEPROM: Electrically Erasable Programmable ROM, for example), etc. The processing device 10 implements a drive support at the time of travel in a back direction (at the time of exiting from a parking space) based on detection information from the rear-side radars 30, as described hereinafter.

The processing device 10 includes a radar information acquisition part 101, an invalidation setting part 102, an invalidating part 103, an object information generating part 104, a drive support control part 105, and a storage part 106.

The radar information acquisition part 101, the invalidation setting part 102, the invalidating part 103, the object information generating part 104, and the drive support control part 105 can be implemented by the CPU executing one or more programs held in the main storage in the processing device 10, for example. Further, the storage part 106 can be implemented by the auxiliary storage.

It is noted that, in the example illustrated in FIG. 1, the radar information acquisition part 101, the invalidation setting part 102, the invalidating part 103, the object information generating part 104, and the storage part 106 are included in an example of a moving object detection apparatus 90. The processing device 10 may be implemented by a plurality of computers. For example, the moving object detection apparatus 90 and the drive support control part 105 may be implemented by separate computers, respectively. Processes performed by the processing device 10 are described hereinafter.

The alarm apparatus 11 is controlled by the processing device 10. The alarm apparatus 11 outputs an alarm in response to an alarm instruction from the processing device 10. The alarm apparatus 11 outputs an alarm with a sound and/or an image. For example, the alarm apparatus 11 may include at least one of a sound output apparatus, such as a buzzer, a speaker, etc., and a display apparatus such as a meter, a display device, etc.

The engine control apparatus 12 controls an engine (not illustrated). The engine control apparatus 12 implements deceleration control in cooperation with the processing device 10, as described hereinafter. For example, the engine control apparatus 12 controls an electronic throttle device (not illustrated) in response to a deceleration instruction from the processing device 10 such that a throttle opening degree becomes its minimum within a range in which an engine stall does not occur. It is noted that, as a drive source of the vehicle, a travel motor may be used in addition to or instead of the engine.

The brake control apparatus 13 controls a brake apparatus (not illustrated). The brake control apparatus 13 implements deceleration control in cooperation with the processing device 10, as described hereinafter. For example, the brake control apparatus 13 controls a brake actuator (pump) and valves in a hydraulic circuit (not illustrated) for generating high-pressure oil in response to the deceleration instruction from the processing device 10 such that wheel cylinder pressures of wheels become predetermined target pressures.

The clearance sonars 20 emit sonic waves to detection areas, and detect an object that may exist in the detection areas based on reflection waves reflected on the object. For example, the clearance sonars 20 are provided at four locations in a rear portion of the vehicle, as illustrated in FIG. 2. The detection information obtained by the clearance sonars 20 is transmitted to the processing device 10.

The rear-side radars 30 are provided in the rear portion of the vehicle. The rear-side radars 30 scan detection waves at least in a horizontal direction, and have detection areas on the rear side of the host vehicle. For example, the rear-side radars 30 have the detection areas that extend in the shape of a sector that becomes wider as a distance from the host vehicle becomes greater, as illustrated in FIG. 2. The rear-side radars 30 emit detection waves other than the sonic waves, such as electromagnetic waves including millimeter waves, laser waves, etc., to detect an object that may exist in the detection areas based on the reflection waves reflected on the object. The rear-side radars 30 include a left rear-side radar 31 provided on the left side of the vehicle rear portion, and a right rear-side radar 32 provided on the right side of the vehicle rear portion. The left rear-side radar 31 has the detection area thereof on a side (i.e., left rear-side) in a left and rear direction, and the right rear-side radar 32 has the detection area thereof on a side (i.e., right rear-side) in a right and rear direction. The detection information obtained by the rear-side radars 30 is transmitted to the processing device 10. The detection information includes a position of the object (relative position), a distance of the object (with respect to the host vehicle), and a relative speed of the object with respect to the host vehicle. The distance of the object includes a lateral distance in a lateral direction of the object. The lateral distance is between the host vehicle and the object in a distance perpendicular to the longitudinal axis (see FIG. 2) of the host vehicle. In the following, as an example, the rear-side radars 30 detect the object with the electromagnetic waves. Further, in the following, as an example, the relative speed of the object is indicated by a component in a moving direction of the object. It is noted that such a relative speed of the object can be calculated based on a change in the position of the object (i.e., the relative position) in time series. Further, in the following, as an example, the position of the object (i.e., the relative position) at a certain time point corresponds to a position of a reflection point (on the object), among one or more reflection points detected at the same time point, at which the distance between the rear-side radars 30 and the object becomes minimum. Such a reflection point (minimizing the distance between the rear-side radars 30 and the object) defines the distance between the rear-side radars 30 and the object.

In FIG. 2, the detection area related to the right rear-side radar 32 of the rear-side radars 30 is indicated by a reference symbol R1. The detection area of the left rear-side radar 31 is symmetrical with respect to that of the right rear-side radar 32 in the left and right direction, and is not illustrated. Further, in FIG. 2, the detection area of the clearance sonars 20 as a whole is indicated by a reference symbol R2. The detection area R2 is formed by a group of detection areas R21, R22, R23, and R24 of the clearance sonars 20. The detection area R1 of the rear-side radars 30 extends longer (from the host vehicle) than the detection area R2 of the clearance sonars 20.

In the example illustrated in FIG. 2, a line L0 represents a rightmost rear-side direction of the right rear-side radar 32. The detection area R1 of the right rear-side radar 32 is set such that the direction of the line L0 is substantially perpendicular to the longitudinal axis Ce of the host vehicle.

The peripheral apparatus 50 includes ECUs (Electronic Control Units) and sensors. For example, the peripheral apparatus 50 includes a shift position sensor, vehicle wheel speed sensors for detecting vehicle speed of the host vehicle, a steering sensor, etc.

Figure 3:
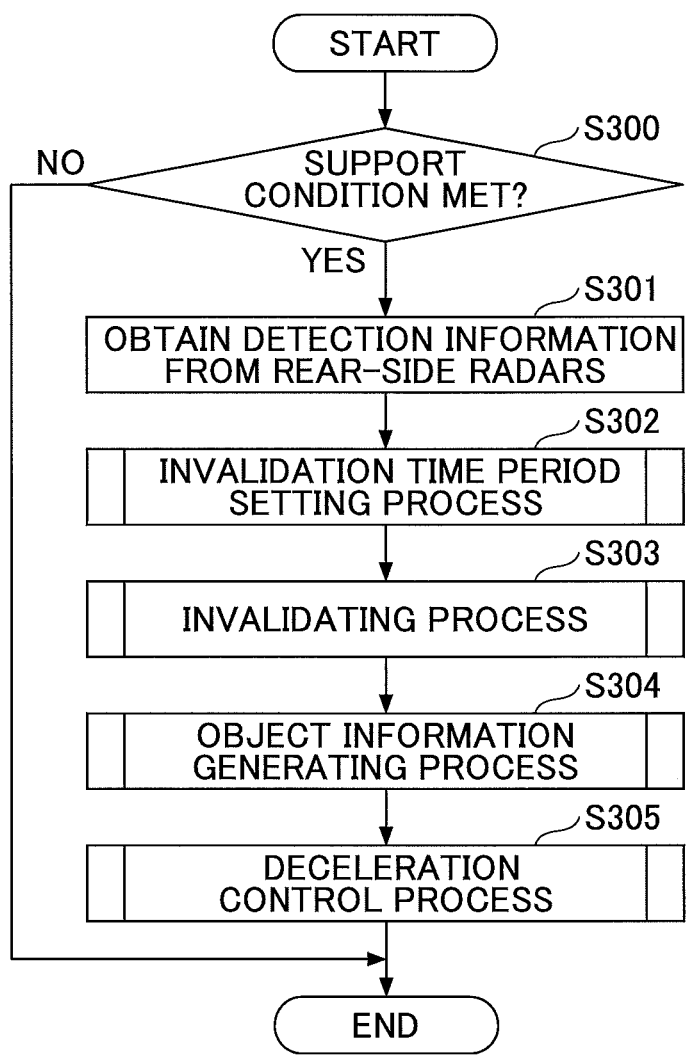
FIG. 3 is a flowchart illustrating an example (first embodiment) of a process executed by a processing device in a vehicle system.

Next, with reference to FIG. 3, etc., embodiments of the processing device that can be implemented in the vehicle system 1 illustrated in FIG. 1 are described. In the following, the process related to the right rear-side radar 32 of the rear-side radars 30 is mainly described; however, the same holds true for the process related to the left rear-side radar 31 (only the approaching direction of the object is reversed in the left and right direction).

[First Embodiment]

FIG. 3 is a flowchart of an example (a first embodiment) of a process executed by the processing device 10. The process illustrated in FIG. 3 is performed every predetermined cycle.

In step S300, the radar information acquisition part 101 determines whether a predetermined support condition is met. The predetermined support condition is met when all the conditions (1) through (2) are met, for example.
(1) a gear ratio for driving the vehicle in the rear direction is being formed (selected).
(2) the vehicle speed is greater than 0 and less than or equal to a predetermined vehicle speed.

The predetermined vehicle speed indicates a low-speed state, and may be about 10 km/h, for example. If it is determined that the predetermined support condition is met, the process routine goes to step S301, otherwise the process routine at the current cycle directly ends.

In step S301, the radar information acquisition part 101 obtains and stores the detection information from the right rear-side radar 32.

In step s303, the invalidation setting part 102 performs an invalidation time period setting process based on the detection information obtained from the right rear-side radar 32 in step S301. An example of the invalidation time period setting process is described hereinafter.

In step S302, with respect to an object (also referred to as "invalidated object", hereinafter) whose moving direction is to be invalidated, the invalidating part 103 performs an invalidation process for invalidating the moving direction of the object during the invalidation time period based on the result of the invalidation time period setting period obtained in step S302. According to the embodiment, the invalidating part 103 implements the invalidation of the moving direction of the invalidated object during the invalidation time period by preventing the moving direction information of the invalidated object from being generated by the object information generating part 104 based on the detection information from the right rear-side radar 32. As a result of this, according to the embodiment, the invalidating part 103 indirectly prevents the drive support control from being performed based on the moving direction information of the invalidated object during the invalidation time period. It is noted that the invalidated object corresponds to the object which has an object ID for which a state of an invalidation flag Fi described hereinafter is "1" (or for which a timer counter Ci described hereinafter is greater than or equal to 1). An example of the invalidation process is described hereinafter.

In step S304, the object information generating part 104 performs an object information generating process for generating object information based on the detection information obtained in step S301 and the invalidation process result obtained in step S303. The object information generating process is performed to generate the object information used for a deceleration control process described hereinafter, and an example of the object information generating process is described hereinafter.

In step S305, the drive support control part 105 performs the deceleration control process based on the object information obtained in step S304. An example of the deceleration control process is described hereinafter.

FIG. 4 is a flowchart illustrating an example of the invalidation time period setting process of step S302 in FIG. 3.

In step S400, the invalidation setting part 102 reads the detection information from the right rear-side radar 32.

In step S402, the invalidation setting part 102 determines, based on the detection information from the right rear-side radar 32, whether a new object is detected. In other words, the invalidation setting part 102 determines whether the object is started to be detected by the right rear-side radar 32. Whether a new object is detected can be determined based on the identity with respect to the detection information items obtained at the previous cycle. If it is determined that a new object is detected, the process routine goes to step S404, otherwise the process routine directly ends.

In step S404, the invalidation setting part 102 allocates a new object ID to the newly detected object. In the following, the object ID is expressed by "i".

In step S406, the invalidation setting part 102 sets a value of a timer counter C to "1" to start the measurement. The timer counters C are prepared for object IDs, respectively. In the following, the timer counter C associated with the object ID=i is expressed by "timer counter Ci".

In step S408, the invalidation setting part 102 calculates, based on the detection information (i.e., the lateral distance and the relative speed) from the right rear-side radar 32 obtained at the current cycle, the invalidation time period related to the newly detected object to store (set) the calculated invalidation time period in the storage part 106. The detection information from the right rear-side radar 32 obtained at the current cycle corresponds to the detection information when a new object is detected. In the following, the lateral distance and the relative speed related to the detection information when the new object is detected are also referred to as a "detection start distance" and "detection start relative speed" hereinafter, respectively.

The invalidation time period starts from timing when the new object is detected. The invalidation time period corresponds to a time period during which the moving direction information based on the detection information (i.e., the detection information from the right rear-side radar 32) related to the newly detected object is invalidated. The invalidation time period set by the invalidation setting part 102 is adapted such that the invalidation time period is equal to a time period corresponding a reflection point unstable section described hereinafter, for example.

Specifically, the invalidation setting part 102 sets, based on the detection start distance and the detection start relative speed, the invalidation time period such that the invalidation time period becomes longer as the detection start distance becomes longer and the invalidation time period becomes shorter as the detection start relative speed becomes greater. This is because, as described hereinafter with reference to FIG. 10A, etc., the reflection point unstable section becomes longer as the detection start distance becomes longer. Further, this is because a period during which the object exists in the reflection point unstable section becomes shorter as the detection start relative speed becomes greater. Such a relationship (i.e., a relationship between the detection start distance, the detection start relative speed, and the invalidation time period) may be defined in mapped data (see FIG. 5) stored in advance in the main storage of the processing device 10. In this case, the invalidation setting part 102 can refer to the stored information in the main storage to set the invalidation time period according to the detection start distance and the detection start relative speed. The invalidation setting part 102 sets and stores the calculated invalidation time period in the storage part 106 such that the calculated invalidation time period is associated with the object ID related to the newly detected object. In the following, the invalidation time period associated with the object ID=i is expressed by "Tmi".

In the example illustrated in FIG. 5, $\Delta Tm1$ through $\Delta Tm9$ represent set values of the invalidation time period. $\Delta Tm1$ through $\Delta Tm9$ have such a relationship that $\Delta Tm1 > \Delta Tm2 > \Delta Tm3$, $\Delta Tm4 > \Delta Tm5 > \Delta Tm6$, $\Delta Tm7 > \Delta Tm8 > \Delta Tm9$, and $\Delta Tm7 > \Delta Tm4 > \Delta Tm1$, $\Delta Tm8 > \Delta Tm5 > \Delta Tm2$, $\Delta Tm9 > \Delta Tm6 > \Delta Tm3$. Further, D20 through D23 represent setting values of the detection start distance. D20 through D23 have such a relationship that D23>D22>D21>D20. Further, Vr0 through Vr3 represent setting values of the detection start relative speed, and have such a relationship that Vr3>Vr2>Vr1>Vr0. Concrete values of these setting values are to be adapted. For example, the invalidation setting part 102 sets the invalidation time period=$\Delta Tm1$ if the detection start distance is in a range between D20 and D21 and the detection start relative speed is in a range between Vr0 and Vr1.

In the example illustrated in FIG. 5, the invalidation time period can be set for nine combinations using three ranges of the detection start distance and three ranges of the detection start relative speed, such that the invalidation time period becomes longer as the detection start distance becomes longer and the invalidation time period becomes shorter as the detection start relative speed becomes greater. However, other setting ways can be used. For example, the invalidation time period may be set for m1×m2 combinations of m1 ranges of the detection start distance and m2 ranges of the detection start relative speed such that the invalidation time period becomes longer as the detection start distance becomes longer and the invalidation time period becomes shorter as the detection start relative speed becomes greater. Here, m1 and m2 are integers greater than or equal to 2, and may be different from each other.

In step S410, the invalidation setting part 102 determines, based on the detection information from the right rear-side radar 32, whether the object, which was detected at the previous cycle, is still detected. If it is determined that the object detected at the previous cycle is still detected, the routine ends directly, otherwise the process routine goes to step S412.

In step S412, the invalidation setting part 102 releases the object ID related to the lost object that is not detected at the current cycle (so that the released object ID becomes available for an object that may be newly detected thereafter), and resets the invalidation flag Fi (described hereinafter) related to the released object ID to "0". Further, the invalidation setting part 102 resets the timer counter Ci related to the released object ID to "0". It is noted that after the invalidation flag Fi and the timer counter Ci have been reset in step S412, the reset invalidation flag Fi and timer counter Ci become available for an object that may be newly detected thereafter.

According to the process illustrated in FIG. 4, the invalidation time period can be set according to the distance (i.e., the detection start distance) and the relative speed (i.e., the detection start relative speed) of the object with respect to the host vehicle at timing when the object is started to be detected by the right rear-side radar 32.

Figure 6:
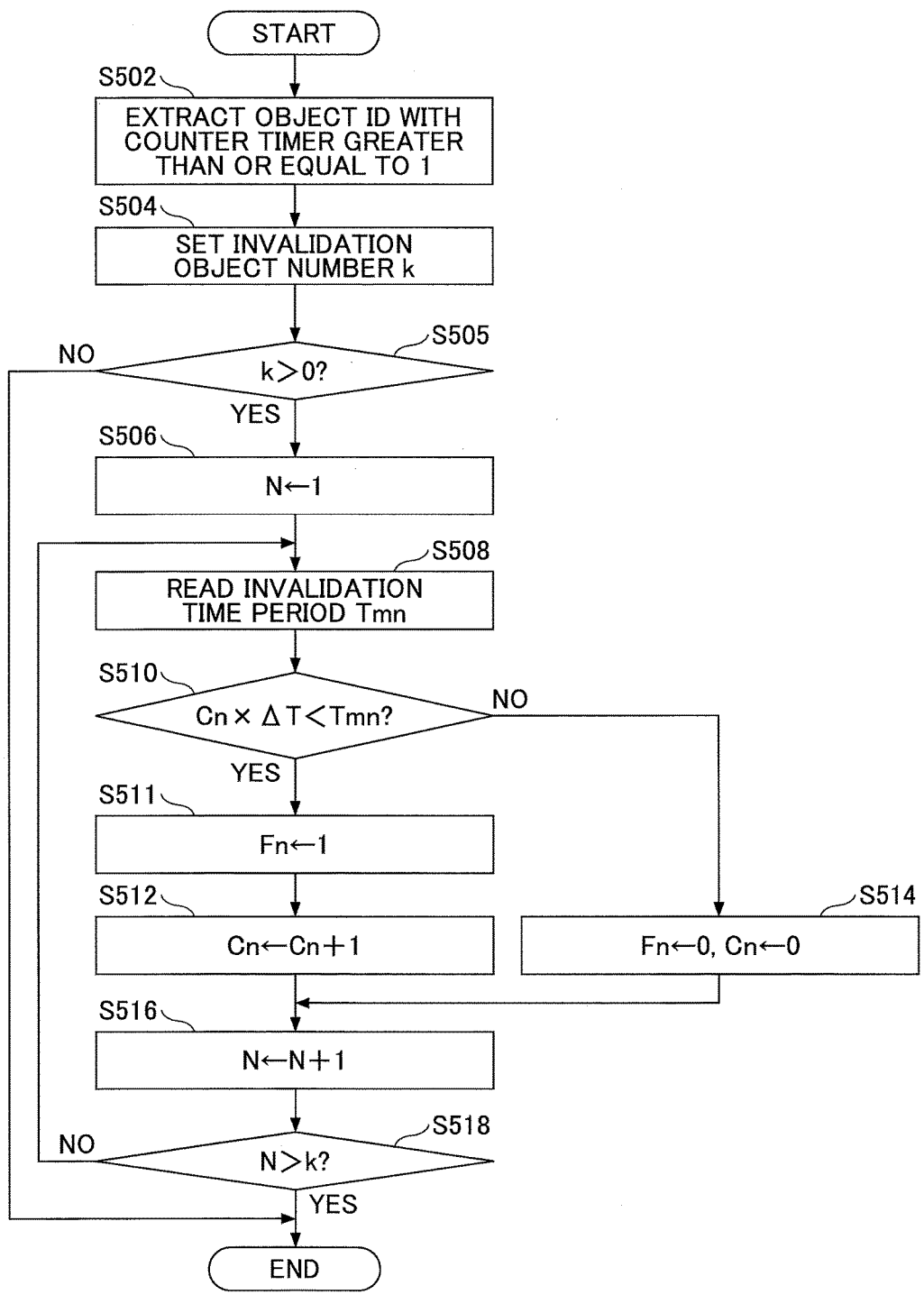
FIG. 6 is a flowchart illustrating an example of an invalidation process of step S303 in FIG. 3.

FIG. 6 is a flowchart illustrating an example of the invalidating process of step S303 in FIG. 3.

In step S502, the invalidating part 103 extracts the object IDs whose values of the timer counters Ci are greater than or equal to 1.

In step S504, the invalidating part 103 sets invalidation object number k based on the number k1 of the extracted object IDs (i.e., k=k1). The invalidation object number k represents the number of the invalidated objects. It is noted that the invalidation object number k is equal to 0 if there is no object ID whose timer counter $C_i$ is greater than or equal to 1 or there is no object detected by the right rear-side radar 32.

In step S505, the invalidating part 103 determines whether the invalidation object number k is greater than 0. If it is determined that the invalidation object number k is greater than 0, the process routine goes to step S506, otherwise the process routine directly ends.

In step S506, the invalidating part 103 sorts the k object IDs extracted in step S502, in an ascending order, for example, and sets a value N to "1". In the following, it is assumed that Nth object ID is "n".

In step S508, the invalidating part 103 reads the invalidation time period $T_{mn}$ related to the Nth object ID (see step S408) from the storage part 106.

In step S510, the invalidating part 103 determines whether a value ($=C_n \times \Delta T$) obtained by multiplying the value of the timer counter $C_n$ related to the Nth object ID by the process cycle $\Delta T$ is smaller than the invalidation time period $T_{mn}$ related to the same object ID. The value obtained by multiplying the value of the timer counter $C_n$ related to the Nth object ID by the process cycle $\Delta T$ represents a duration time of a state in which the moving direction information based on the detection information (i.e. the detection information from the right rear-side radar 32) that is related to the Nth object ID. When the Nth object ID is "1", for example, the invalidating part 103 determines whether the value ($=C_1 \times \Delta T$) obtained by multiplying the value of the timer counter $C_1$ by the process cycle $\Delta T$ is smaller than the invalidation time period $T_{m1}$. If the determination result is such that $C_n \times \Delta T < T_{mn}$, the process routine goes to step S511, otherwise the process routine goes to step S514.

In step S511, the invalidating part 103 sets the invalidation flag $F_n$ related to Nth object ID to "1". There are invalidation flags on an object ID basis, and initial values thereof are "0". The invalidation flag $F_i$ being "1" represents a state (i.e., the invalidated state) in which the moving direction information related to the object whose object ID is "i" is invalidated, and the invalidation flag $F_i$ being "0" represents a state (i.e., the invalidated state is canceled) in which the moving direction information related to the object whose object ID is "i" is not in the invalidated state.

In step S512, the invalidating part 103 increments the timer counter $C_n$ related to Nth object ID by "1".

In step S514, the invalidating part 103 sets the invalidation flag $F_n$ related to Nth object ID to "0". As a result of this, with respect to the object whose the object ID is "n", the invalidated state is canceled. Further, the invalidating part 103 resets the timer counter $C_n$ related to the Nth object ID to "0".

In step S516, the invalidating part 103 increments the value N by "1".

In step S518, the invalidating part 103 determines whether the value N is greater than the invalidation object number k. If it is determined that the value N is greater than the invalidation object number k, the process routine ends directly, otherwise the process routine repeats the processes from step S508 until the value N becomes greater than the invalidation object number k. In this way, with respect to all the invalidation object numbers k of the objects, it is determined whether the invalidated state is set (maintained) based on the invalidation time period $T_{mi}$.

According to the process illustrated in FIG. 6, with respect to the newly detected object, the invalidation flag $F_i$ can be set, and the state in which the invalidation flag $F_i$ is "1" the invalidated state in which the moving direction information related to the object is invalidated) can be maintained until the lapse of the invalidation time period related to the object.

Figure 7:
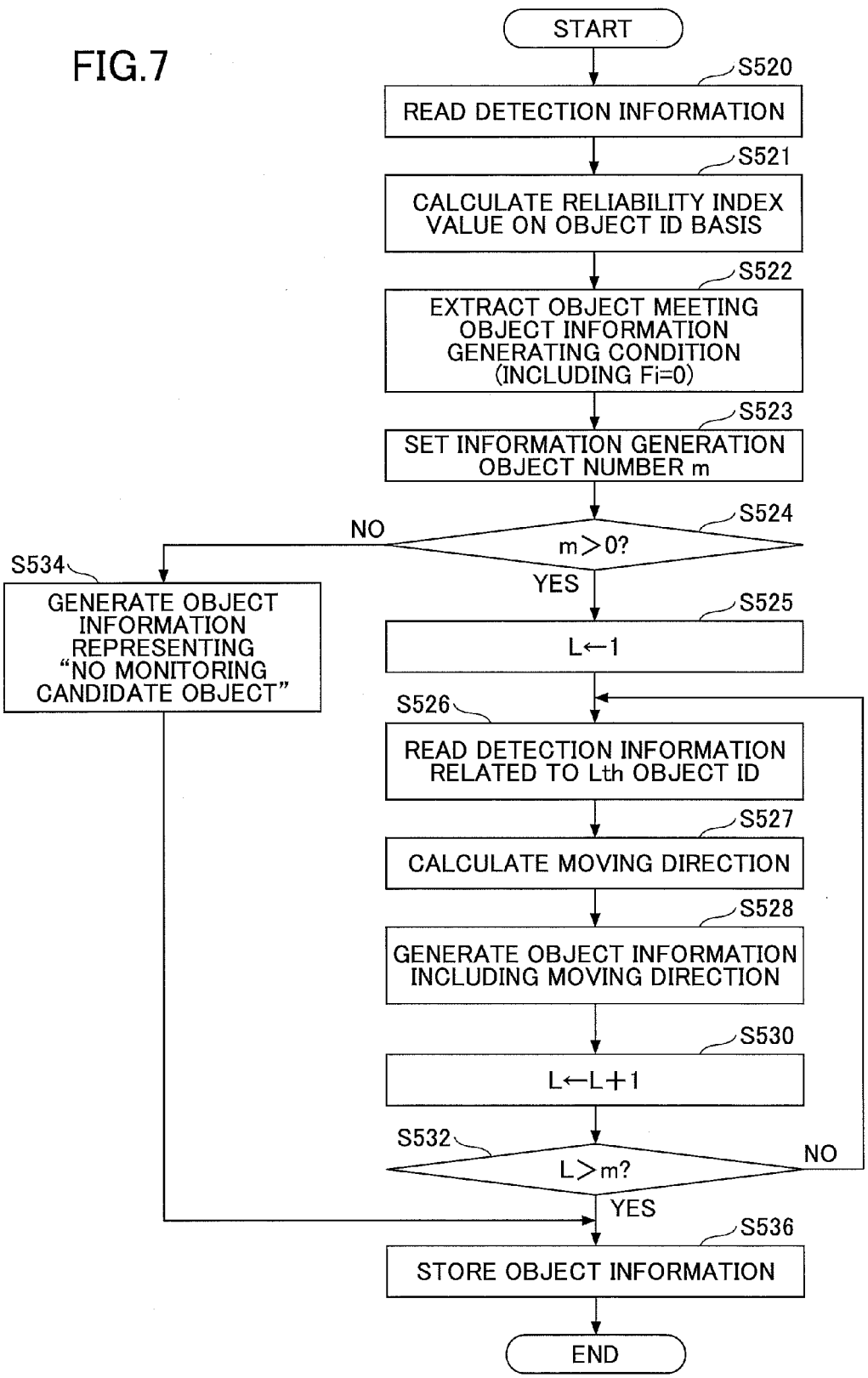
FIG. 7 is a flowchart illustrating an example of an object information generating process of step S304 in FIG. 3.

FIG. 7 is a flowchart illustrating an example of the object information generating process of step S304 in FIG. 3.

In step S520, the object information generating part 104 reads the detection information related to the current cycle from the right rear-side radar 32 to store it in the storage part 106. The detection information is stored in the storage part 106 such that the detection information is associated with the corresponding object ID. It is noted that the detection information related to the object ID of the lost object which was detected previously but is not detected at the current cycle may be deleted from the storage part 106.

In step S521, the object information generating part 104 calculates, based on the detection information from the right rear-side radar 32, an index value (referred to as "a reliability index value", hereinafter) related to the object detection on an object ID basis. The reliability index value is calculated based on reception strength of the reflection wave related to the object and/or the successive detection number of the object, etc., such that the reliability index value becomes higher as the probability that the object actually exists becomes higher. For example, the reliability index value is binary such that if the reception strength of the reflection wave related to the object is greater than or equal to a predetermined value and the object is successively detected over a predetermined number of cycles, the reliability index value is set to "1", otherwise the reliability index value is set to "0".

In step S522, the object information generating part 104 extracts the object that meets a predetermined object information generating condition, among one or more objects related to the detection information obtained at the current cycle from the right rear-side radar 32. The predetermined object information generating condition is met when all the conditions (11) through (13) are met, for example.

(11) the invalidation flag $F_i$ is "0".
(12) the reliability index value is "1".
(13) the object is moving in an approaching direction with respect to the vehicle (i.e., there is a probability that the object passes behind the host vehicle in the left and right direction in the future).

In step S523, the object information generating part 104 sets information generation object number m based on the number m1 of the extracted objects (i.e., m=m1).

In step S524, the object information generating part 104 determines whether the information generation object number m is greater than 0. If it is determined that the information generation object number m is greater than 0, the process routine goes to step S525, otherwise the process routine goes to step S534.

In step S525, the object information generating part 104 sorts the m object IDs of the objects extracted in step S521, in an ascending order, for example, and sets a value L to "1". In the following, it is assumed that Lth object ID is "1".

In step S526, the object information generating part 104 reads the detection information obtained at and before the current cycle and related to the Lth object ID from the storage part 106.

In step S527, the object information generating part 104 calculates, based on the detection information (i.e., the information related to the position of the object) read in step S526, the moving direction (i.e., a movement vector) of the object related to the Lth object ID. The moving direction can be calculated, based on the detection information obtained over a predetermined period $\Delta T_n$ including the current cycle, from a change in the position of the object (i.e., the relative position with respect to the host vehicle). For example, RANSAC (RANdom SAmple Consensus) algorithm can be used for the calculation of the moving direction in which least squares method is repeatedly applied to samples of the relative positions that are randomly extracted from the data in the predetermined period $\Delta Tn$ including the current cycle.

In step S528, the object information generating part 104 generates the object information with respect to the object related to the object of the Lth object ID. The object information includes the moving direction information representing the moving direction calculated in the step S527. The object information includes information used in the calculation of control parameters described hereinafter (the position of the object, the reliability index value, the relative speed of the object, the lateral distance of the object, etc., for example), in addition to the moving direction information.

In step S530, the object information generating part 104 increments the value L by "1".

In step S532, the object information generating part 104 determines whether the value L is greater than the information generation object number m. If it is determined that the value L is greater than the information generation object number m, the process routine ends directly, otherwise the process routine repeats the processes from step S526 until the value L becomes greater than the information generation object number m. In this way, the object information with respect to all the information generation object numbers m of the objects is generated.

In step S534, the object information generating part 104 generates the object information representing that an object (referred to as a "monitoring candidate object", hereinafter) that could be one to be monitored is not detected. It the following, the object information generated in step S534 is referred to as "non-detected object information".

In step S536, the object information generating part 104 stores the generated object information related to one or more objects in the storage part 106. The object information is stored in the storage part 106 such that the object information is associated with the corresponding object ID. It is noted that, as an example, it is assumed that the object information stored in the storage part 106 is updated (rewritten) every cycle.

According to the process illustrated in FIG. 7, with respect to the object related to the object ID for which the invalidation flag Fi is "1", the moving direction information is not generated, and thus the moving direction information is generated for only the object related to the object ID for which the invalidation flag Fi is "0". Specifically, according to the process illustrated in FIG. 7, with respect to the object related to the object ID for which the invalidation flag Fi is "1", the moving direction is not calculated during the invalidation time period related to the object, and the moving direction of the object is calculated after the lapse of the invalidation time period related to the object.

Figure 8:
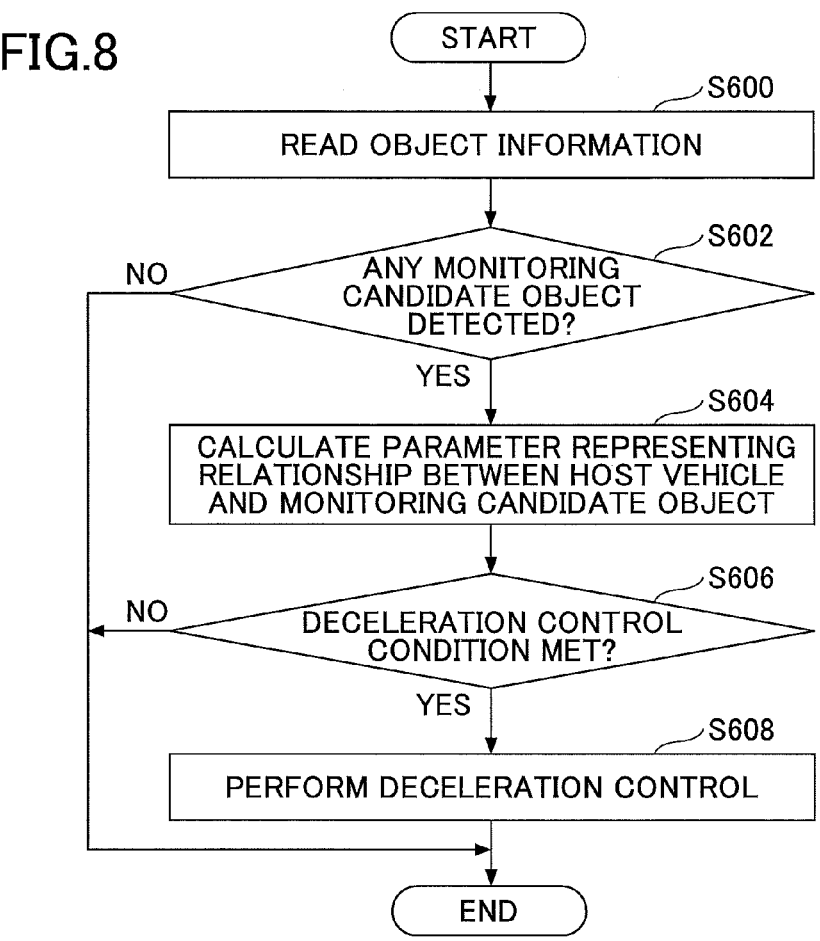
FIG. 8 is a flowchart illustrating an example of a deceleration process of step S305 in FIG. 3.

FIG. 8 is a flowchart illustrating an example of the deceleration control process of step S305 in FIG. 3.

In step S600, the drive support control part 105 reads the object information from the storage part 106.

In step S602, the drive support control part 105 determines, based on the object information, whether any monitoring candidate object (that could be one to be monitored) is detected. The drive support control part 105 determines that no monitoring candidate object is detected, if the object generated at the current cycle is the non-detected object information (see step S534). If it is determined that at least one monitoring candidate object(s) is detected, the process routine goes to step S604, otherwise the process routine directly ends.

In step S604, the drive support control part 105 calculates, based on the object information related to the monitoring candidate object, predetermined control parameters representing a relationship between the monitoring candidate object and the host vehicle, on a monitoring candidate object basis. The predetermined control parameters are as follows, for example.

Parameter 1: a position of an intersection between the moving direction of the monitoring candidate object and the moving direction of the host vehicle.

Parameter 2: an angle between the moving direction of the monitoring candidate object and the moving direction of the host vehicle.

Parameter 3: a time period $\Delta Tc$ from the current time point to a time point when the monitoring candidate object reaches the position of the intersection.

Parameter 4: deceleration required to stop the host vehicle before the host vehicle reaches the position of the intersection.

The parameters 1 and 2 may be calculated on a premise that the moving direction of the host vehicle is the same as the longitudinal axis Ce of the host vehicle.

In step S606, the drive support control part 105 regards (selects) the monitoring candidate object whose time period $\Delta Tc$ is the smallest as a monitoring object, and determines, based on the control parameters (calculated in step S604) related to the monitoring object, whether a predetermined deceleration control condition is met. The predetermined deceleration control condition is met when conditions (21) through (23) are met, for example.

(21) a distance between the position of the intersection and the host vehicle (along the moving direction of the host vehicle) is less than or equal to a predetermined distance Dth.

(22) the time period $\Delta Tc$ is less than or equal to a predetermined value.

(23) magnitude of the deceleration G required to stop at a target stop position exceed a predetermined threshold.

The predetermined distance Dth is set based on an angle (referred to as "the angle $\gamma$", hereinafter) between the moving direction of the monitoring object and the moving direction of the host vehicle. For example, in the case where the angle $\gamma$ is between 0 and 90 degrees, the predetermined distance Dth is constant (a value between 3 and 5 [m], for example), while, in the case where the angle $\gamma$ is between 90 and 180 degrees, the predetermined distance Dth is varied such that the predetermined distance Dth becomes shorter as the angle $\gamma$ approaches 90 degrees and the predetermined distance Dth becomes longer as the angle $\gamma$ approaches 180 degrees. The target stop position is set based on the position of the intersection. It is noted that the distance between the position of the intersection and the host vehicle being less than or equal to a predetermined distance Dth is met even in the case where the position of the intersection is forward with respect to the rear end of the host vehicle (i.e., in a region corresponding to a trunk or rear seats, etc.). If it is determined that the predetermined deceleration control condition is met, the process routine goes to step S608, otherwise the process routine directly ends.

In step S608, the drive support control part 105 outputs a deceleration instruction to the brake control apparatus 13 and the engine control apparatus 12 to perform the deceleration control (an example of the drive support control) with respect to the monitoring object for which the predetermined deceleration control condition is met. It is noted that, during the execution of the deceleration control or prior to the execution of the deceleration control, an alarm output control (another example of the drive support control) may be performed.

According to the process illustrated in FIG. 8, the deceleration control can be performed based on the object information (the moving direction information of the monitoring object, for example) generated by the object information generating part 104. Here, the object information generated by the object information generating part 104 does not include the object information related to the object of the object ID for which the invalidation flag Fi is "1". Thus, according to the process illustrated in FIG. 8, with respect to the object of the object ID for which the invalidation flag Fi is "1", the deceleration control based on the object information related to the object is not performed (i.e., prevented).

Figure 9A:
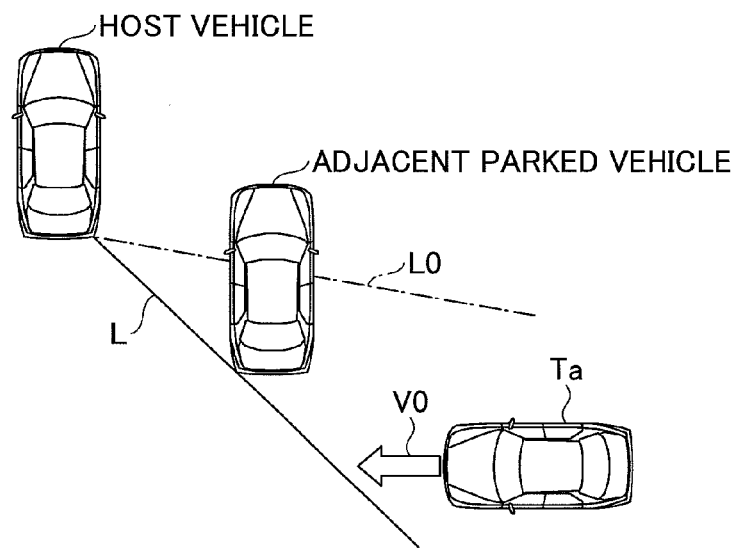
FIG. 9A is a diagram explaining a state in which radio wave from a right-side radar 32 is shielded due to an adjacent parked vehicle (other than a host vehicle).
Figure 9B:
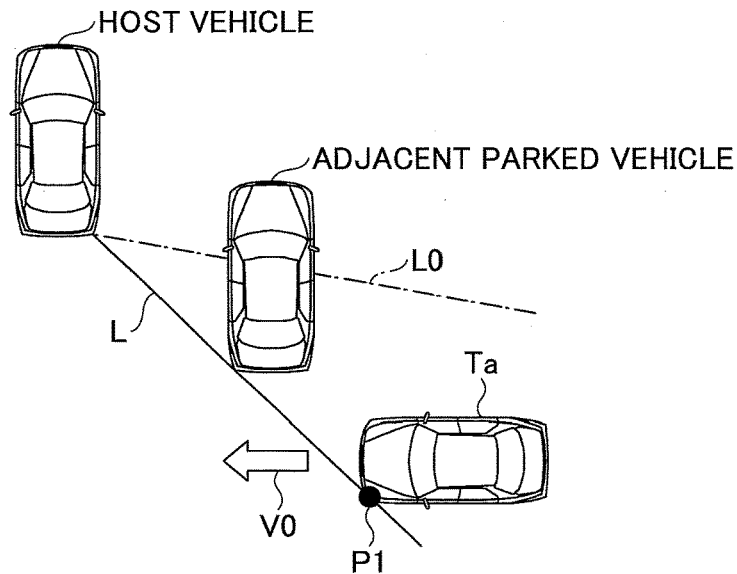
FIG. 9B is a diagram explaining a change in reflection points of the radio wave from the right-side radar 32 due to the adjacent parked vehicle (other than the host vehicle).
Figure 9C:
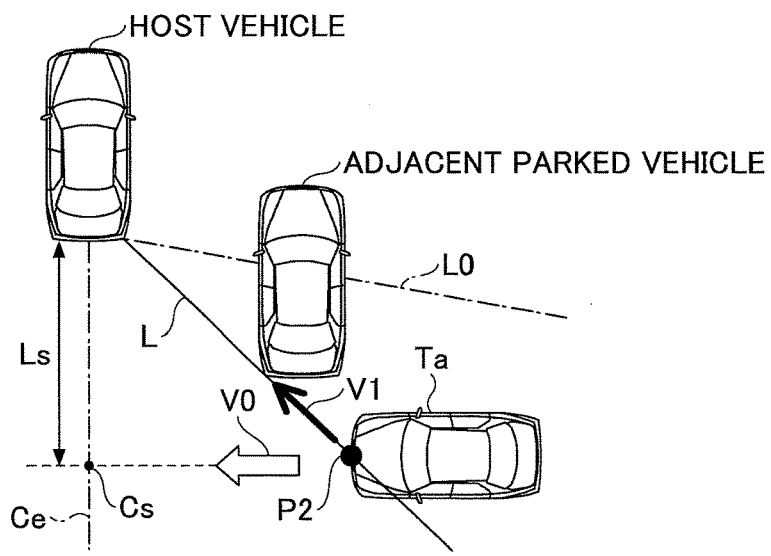
FIG. 9C is a diagram explaining a change in reflection points of the radio wave from the right-side radar 32 due to the adjacent parked vehicle (other than the host vehicle).

FIGS. 9A through 9C are diagrams explaining a change in reflection points of the radio wave from the right-side radar 32 on the monitoring object due to an adjacent parked vehicle (other than the host vehicle).

FIGS. 9A through 9C are plan views schematically illustrating scenes in which the monitoring object (an approaching vehicle in the illustrated example) Ta travels on the rear-side of the host vehicle. FIG. 9A illustrates a state at time point ta, FIG. 9B illustrates a state at time point tb after time point ta, and FIG. 9C illustrates a state at time point tc after time point tb. In the illustrated example, the host vehicle and the adjacent parked vehicle do not move during a time period from time point ta to time point tc, and only the approaching vehicle Ta moves in a moving direction V0 indicated by an arrow. In FIGS. 9A through 9C, the line L corresponds to a direction of the radio wave from the right rear-side radar 32 and indicates the rightmost rear-side direction of the propagation of the radio wave from the right rear-side radar 32 without being shielded by the adjacent parked vehicle. It is noted that the line L is located closer to the longitudinal axis Ce in comparison with the rightmost rear-side direction L0 of the detection area R1 of the right rear-side radar 32 (see FIG. 2).

At time point ta, as illustrated in FIG. 9A, the approaching vehicle Ta is not detected by the right rear-side radar 32 due to the adjacent parked vehicle shielding the propagation of the radio wave from the right rear-side radar 32.

At time point tb, as illustrated in FIG. 9B, the approaching vehicle Ta reaches a critical position that is geometrically defined by a relationship between the adjacent parked vehicle and the right rear-side radar 32, and thus starts to be detected by the right rear-side radar 32. At that time, the approaching vehicle Ta is detected by the right rear-side radar 32 due to the reflection point P1 at which the radio wave along the line L is reflected. The reflection point P1 is the rear end (i.e., the rear end viewed from the host vehicle) of the front portion of the approaching vehicle Ta. It is noted that the "front" of portion of the approaching vehicle Ta is defined when viewed from the driver in the approaching vehicle Ta.

At time point tc, as illustrated in FIG. 9C, the approaching vehicle Ta further moves from the critical position to approach the host vehicle. At that time, the approaching vehicle Ta is detected by the right rear-side radar 32 due to the reflection point P2 at which the radio wave along the line L is reflected. The reflection point P2 on the approaching vehicle Ta is located forward with respect to the reflection point P1, as illustrated in FIG. 9B and FIG. 9C. It is noted that the reflection point P2 defines the distance between the host vehicle and the approaching vehicle Ta in the state illustrated in FIG. 9C. In this way, the reflection point on the approaching vehicle Ta related to the radio wave along the line L moves forward as the approaching vehicle Ta approaches the host vehicle. The moving direction V1 of the approaching vehicle, which can be calculated based on the detection information of the approaching vehicle by the right rear-side radar 32, has the increased error with respect to the actual moving direction V0 of the approaching vehicle due to the change in the position of the reflection point, as schematically illustrated in FIG. 9C. In this way, if the position of the reflection point defining the distance between the host vehicle and the approaching vehicle Ta substantially moves on the approaching vehicle Ta, the moving direction V1 of the approaching vehicle, which can be calculated based on the detection information of the approaching vehicle by the right rear-side radar 32, has the increased error with respect to the actual moving direction V0 of the approaching vehicle. When the approaching vehicle Ta exists in a particular section geometrically defined by a positional relationship between the adjacent parked vehicle and the host vehicle (i.e., the right rear-side radar 32), the position of the reflection point defining the distance between the host vehicle and the approaching vehicle Ta substantially moves on the approaching vehicle Ta. In the following, the particular section is referred to as "a reflection point unstable section".

Figure 10A:
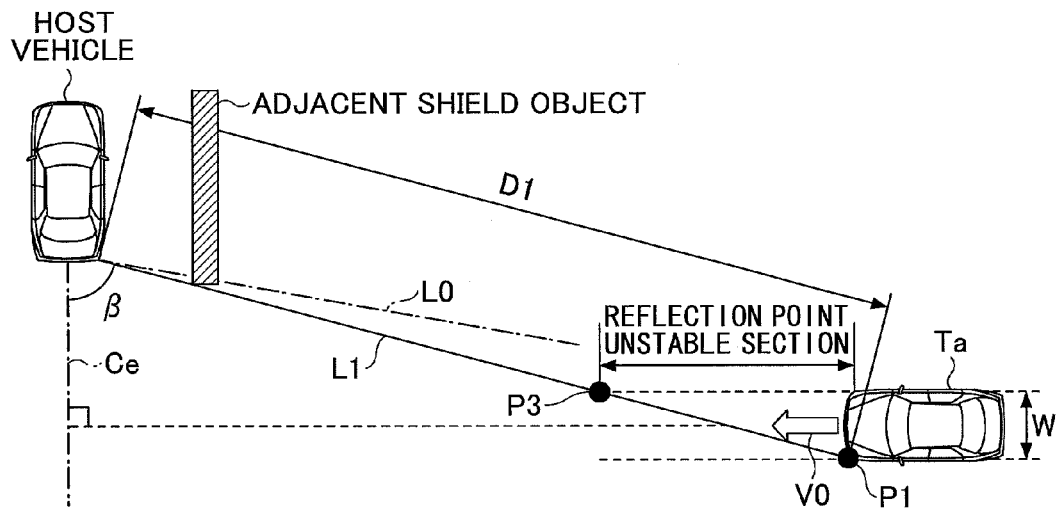
FIG. 10A is a diagram explaining a reflection point unstable section of the right-side radar 32 when a shielded range due to a shield object is relatively small.
Figure 10B:
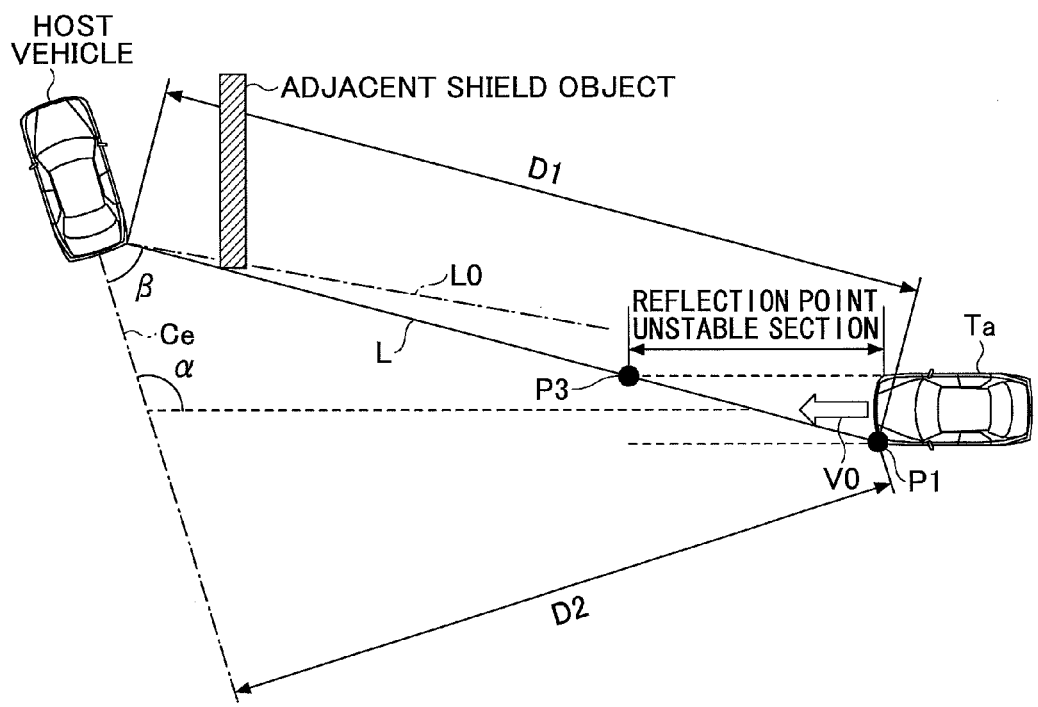
FIG. 10B is a diagram explaining a reflection point unstable section of the right-side radar 32 when the shielded range due to the shield object is relatively small.
Figure 11A:
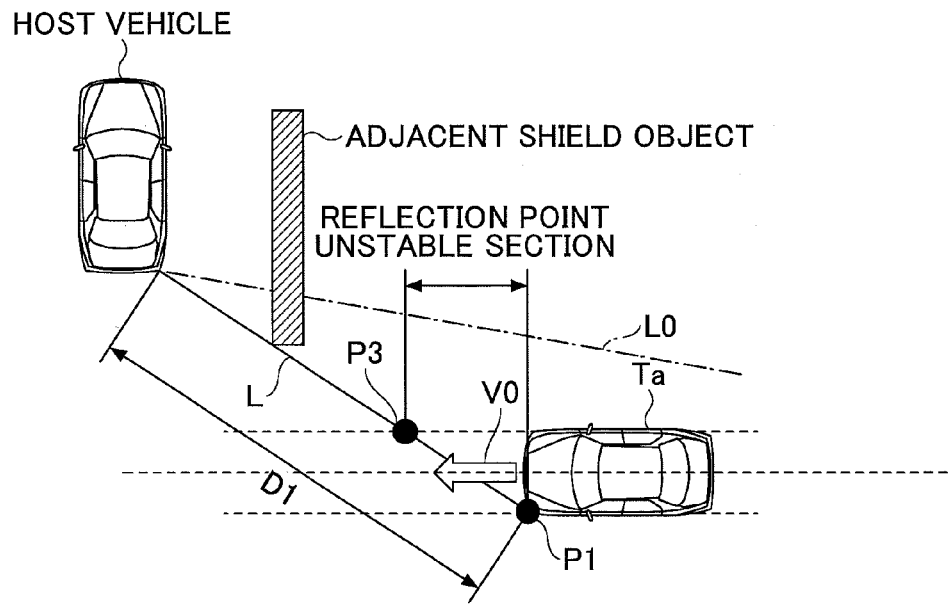
FIG. 11A is a diagram explaining a reflection point unstable section of the right-side radar 32 when a shielded range due to a shield object is relatively great.
Figure 11B:
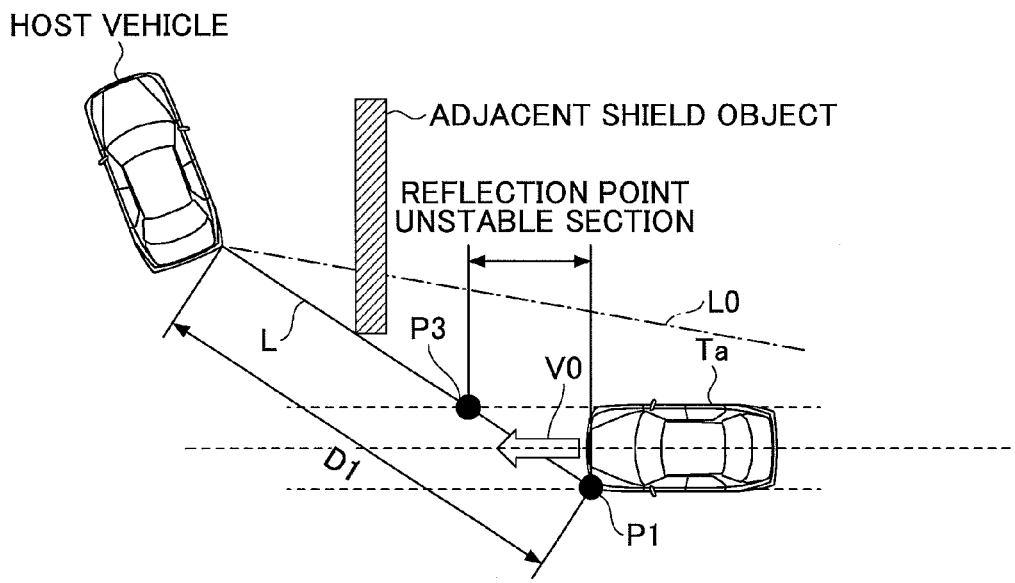
FIG. 11B is a diagram explaining a reflection point unstable section of the right-side radar 32 when the shielded range due to the shield object is relatively great.

FIG. 10A, FIG. 10B, FIG. 11A, and FIG. 11B are diagrams explaining the reflection point unstable section of the right rear-side radar 32 due to a shield object, and are plan views that schematically illustrates a state in which the monitoring object (the approaching vehicle in the illustrated example) Ta, which is on a course to pass behind the host vehicle, reaches the critical position. FIG. 10A and FIG. 11A illustrate parked states of the host vehicle in which the longitudinal axis Ce of the host vehicle is perpendicular to the moving direction V1 of the approaching vehicle. FIG. 10B and FIG. 11B illustrate parked states of the host vehicle in which the angle between the longitudinal axis Ce of the host vehicle and the moving direction V1 of the approaching vehicle is a (120 degrees, for example) greater than or equal to 90 degrees. Further, FIG. 10A and FIG. 10B illustrate the case where the emission angle range (i.e., the shield range) of the radio wave of the right rear-side radar 32 in which the radio wave is shielded by the adjacent shield object is relatively small, and FIG. 11A and FIG. 11B illustrate the case where the emission angle range (i.e., the shield range) of the radio wave of the right rear-side radar 32 in which the radio wave is shielded by the adjacent shield object is relatively great.

In FIG. 10A, FIG. 10B, FIG. 11A, and FIG. 11B, the shield object (i.e., the adjacent shield object) that shields the right rear-side radar 32 is schematically illustrated. Further, in FIG. 10A, FIG. 10B, FIG. 11A, and FIG. 11B, the reflection point of the radio wave of the right rear-side radar 32 on the approaching vehicle at the critical position (i.e., the rear end of the front portion of the approaching vehicle Ta) is indicated by "P1". When the approaching vehicle moves from the position illustrated in FIG. 10A, FIG. 10B, FIG. 11A, and FIG. 11B to approach the host vehicle, the reflection point of the radio wave of the right rear-side radar 32 on the approaching vehicle, which defines the distance between the host vehicle and the approaching vehicle Ta, moves to the front end of the front portion of the approaching vehicle Ta, as described above. The position (imaginary position) of the front end of the front portion of the approaching vehicle at that timing is indicated by "P3" in FIG. 10A, FIG. 10B, FIG. 11A, and FIG. 11B.

The reflection point unstable section is from the critical position (the position of the approaching vehicle that generates the reflection point P1) to the position of the vehicle at which the reflection point P3 is located on the front end of the front portion of the approaching vehicle, as illustrated in FIG. 10A, FIG. 10B, FIG. 11A, and FIG. 11B. The reflection point unstable section is defined in a direction of the moving direction V0. The reflection point unstable section becomes longer in the case of the decreased shield range than in the case of the increased shield range, as illustrated in FIG. 10A, FIG. 10B, FIG. 11A, and FIG. 11B. In other words, the reflection point unstable section is longer in the example illustrated in FIG. 10A and FIG. 10B than in the example illustrated in FIG. 11A and FIG. 11B. As illustrated in FIG. 10A, FIG. 10B, FIG. 11A, and FIG. 11B, the length of the reflection point unstable section does not have a substantial correlation with respect to the angle between the longitudinal axis Ce of the host vehicle and the moving direction V1 of the approaching vehicle, but has a substantial correlation with respect to the distance D1 or D2 (see FIG. 10B) (equates to the detection start distance) of the approaching vehicle Ta at the critical position detected by the right rear-side radar 32. In other words, the length of the reflection point unstable section has such a tendency that the length becomes longer as the distance D1 or D2 becomes longer, as illustrated in FIG. 10A, FIG. 10B, FIG. 11A, and FIG. 11B. It is noted that the distance D1 represents a straight distance from the right rear-side radar 32 to the reflection point P1, and the distance D2 corresponds to the lateral distance of the reflection point P1 (see FIG. 10B).

As described above with reference to FIG. 9A through FIG. 9C, if the moving direction of the approaching vehicle is calculated based on the detection information of the approaching vehicle obtained by the right rear-side radar 32 when the approaching vehicle exists in the reflection point unstable section, the moving direction V1 of the approaching vehicle thus calculated has increased error with respect to the actual moving direction V0 of the approaching vehicle, as schematically illustrated in FIG. 9C. In this way, the detection information of the approaching vehicle obtained by the right rear-side radar 32 when the approaching vehicle exists in the reflection point unstable section causes the decreased accuracy of the moving direction of the approaching vehicle calculated therefrom. The reflection point unstable section is correlated with the distance D1 or D2 (see FIG. 10B) (equates to the detection start distance) of the approaching vehicle Ta at the critical position detected by the right rear-side radar 32, as described above with reference to FIG. 10A, FIG. 10B, FIG. 11A, and FIG. 11B. In other words, the length of the reflection point unstable section has such a tendency that the length becomes longer as the distance D1 or D2 becomes longer.

According to the first embodiment, with respect to the invalidated object, the moving direction information of the object during the invalidation time period is invalidated. Specifically, with respect to the invalidated object, the generation of the moving direction information of the object is prevented during the invalidation time period. Thus, it becomes possible to increase the probability that the moving direction of the object can be invalidated while the object exists in the reflection point unstable section. As a result of this, it becomes possible to reduce the probability that the moving direction of the object with the insufficient accuracy is used in the drive support control.

Further, according to the first embodiment, as described above, because the invalidation time period is set based on the detection start distance such that the invalidation time period becomes longer as the detection start distance becomes longer, it becomes possible to adapt the invalidation time period to the period corresponding to the reflection point unstable section with increased accuracy. Thus, according to the first embodiment, it becomes possible to implement compatibility between the increased accuracy of the moving direction of the object and the decreased delay in the timing at which the moving direction of the object becomes available (and thus the decreased delay in the start timing of the drive support control). Specifically, if the invalidation time period becomes unnecessarily long, a problem occurs such that the timing at which the moving direction of the object becomes available for the drive support control is unnecessarily delayed, and thus the start timing of the drive support control is unnecessarily delayed. Further, if the invalidation time period is excessively short, a problem occurs such that the probability that the detection information of the right rear-side radar 32 related to the reflection point unstable section is used in the calculation of the moving direction of the object is increased, and thus the accuracy (reliability) of the moving direction of the object becomes worse. In contrast, according to the first embodiment, the probability that such a problem occurs can be reduced.

Further, according to the first embodiment, as described above, the moving direction of the object is not generated during the invalidation time period of the object. Thus, the deceleration control based on the moving direction information related to the invalidated object (during the invalidation time period) can be prevented. As a result of this, the probability that the deceleration control is performed based on the moving direction information of the object with insufficient accuracy is reduced, which increases the reliability of the deceleration control.

Specifically, for example, in the example illustrated in FIG. 9C, it is assumed that the distance Ls (i.e., the distance between the intersection point Cs and the host vehicle) to the intersection point Cs based on the actual moving direction V0 of the approaching vehicle is not less than or equal to the predetermined distance Dth. In such a case, if the moving direction V1 is calculated as the moving direction of the approaching vehicle Ta to be available for the deceleration control, the intersection point becomes closer to the host vehicle with respect to the actual intersection point Cs and thus the distance between the intersection point Cs and the host vehicle becomes less than or equal to the predetermined distance Dth, which causes the deceleration control to be performed unnecessarily. In contrast, according to the first embodiment, the probability that the deceleration control is thus performed unnecessarily can be reduced.

Further, according to the first embodiment, as described above, the invalidation time period is set based on the detection start distance, and thus the invalidation time period can be set according to the size of the shield range due to the shield object (i.e., the length of the reflection point unstable section). As a result of this, it becomes possible to reduce the probability that the period during which the deceleration control is prevented is too long or too short.

[Second Embodiment]

Figure 12:
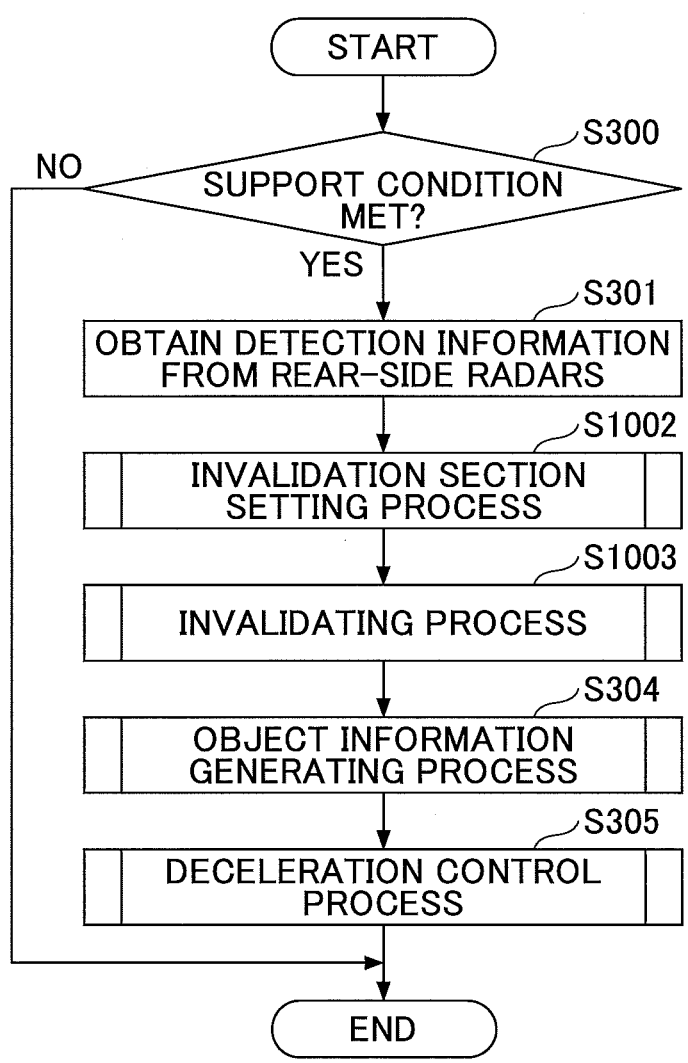
FIG. 12 is a flowchart illustrating an example (second embodiment) of a process executed by a processing device in a vehicle system.
Figure 13:
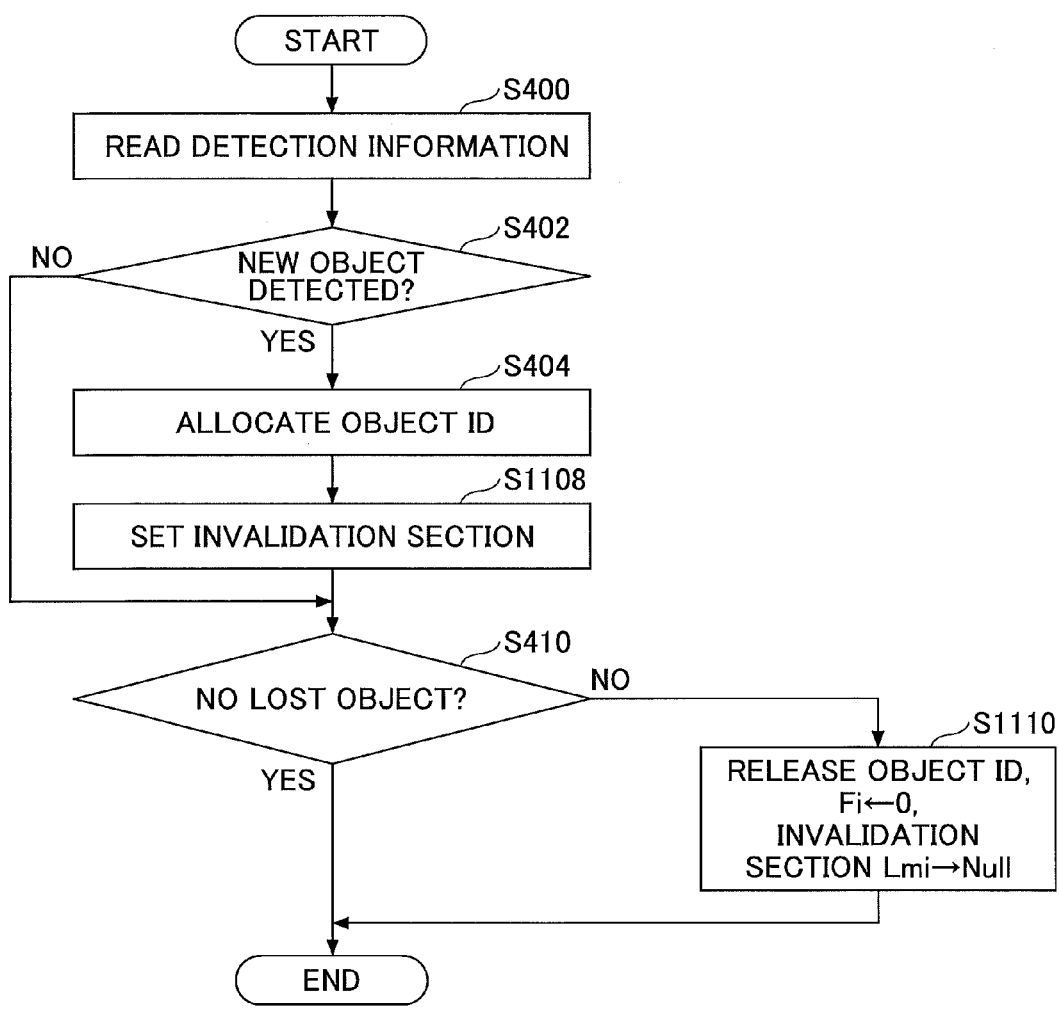
FIG. 13 is a flowchart illustrating an example of an invalidation section setting process of step S1002 in FIG. 12.
Figure 14:
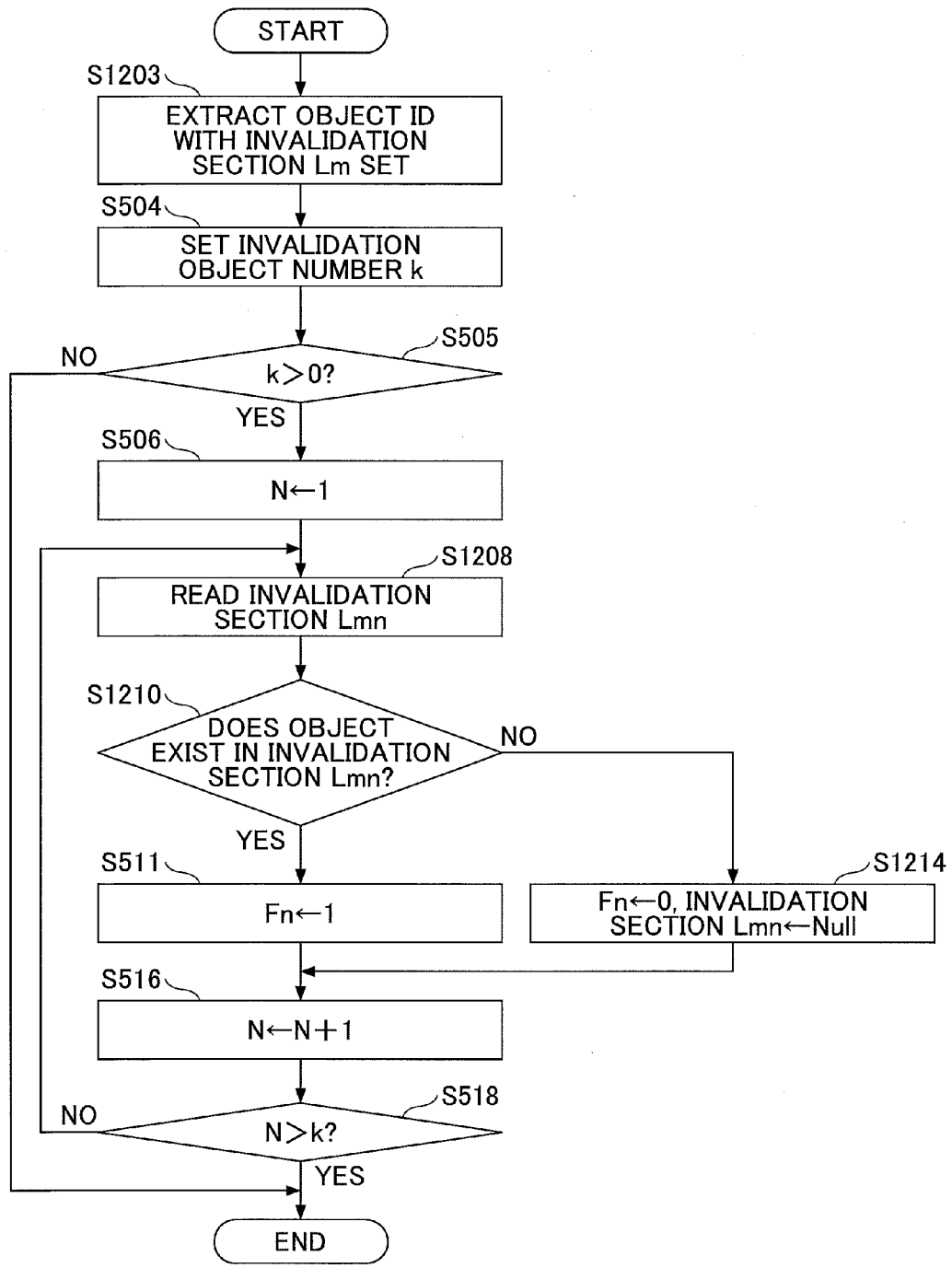
FIG. 14 is a flowchart illustrating an example of an invalidation process of step S1004 in FIG. 12.

Next, with reference to FIGS. 12 through 14, another embodiment (second embodiment) is explained. The second embodiment differs from the first embodiment described above in that the processing device 10 is replaced with the processing device 10A. The processing device 10A includes a radar information acquisition part 101A, an invalidation setting part 102A, an invalidating part 103A, an object information generating part 104A, a drive support control part 105A, and a storage part 106A. The illustration of the processing device 10A is omitted because it is substantially the same as FIG. 1.

The functions of the radar information acquisition part 101A, the object information generating part 104A, and the drive support control part 105A are the same as those of the corresponding parts, and thus explanation thereof is omitted.

According to the first embodiment described above, the calculation of the moving direction based on the detection information of the right rear-side radar 32 is prevented during the invalidation time period. In contrast, according to the second embodiment described hereinafter, an invalidation section corresponding to the reflection point unstable section is set, and the calculation of the moving direction based on the detection information of the right rear-side radar 32 is prevented during a period in which the object exists in the invalidation section.

FIG. 12 is a flowchart of an example (the second embodiment) of a process executed by the processing device 10A. The process illustrated in FIG. 12 is performed every predetermined cycle.

The process illustrated in FIG. 12 differs from the process illustrated in FIG. 3 in that the invalidation time period setting process in step S302 is replaced with an invalidation section setting process in step S1002, and the invalidating process in step S303 is replaced with an invalidating process in step 1003. The other processes are the same, and thus explanation thereof is omitted.

In step S1002, the invalidation setting part 102A performs an invalidation section setting process based on the detection information obtained from the right rear-side radar 32 in step S301. An example of the invalidation section setting process is described hereinafter.

In step S1003, the invalidating part 103A performs the invalidation process for invalidating the moving direction of the object in the invalidation section, based on the result of the invalidation section setting period obtained in step S1002. According to the second embodiment, the invalidating part 103A implements the invalidation of the moving direction of the object in the invalidation section by preventing the moving direction information of the object in the invalidation section from being generated by the object information generating part 104A based on the detection information from the right rear-side radar 32. As a result of this, according to the second embodiment, the invalidating part 103A indirectly prevents the drive support control from being performed based on the moving direction information of the object in the invalidation section. The object in the invalidation section corresponds to the object of the object ID for which the invalidation flag is set to "1". An example of the invalidation process is described hereinafter.

FIG. 13 is a flowchart illustrating an example of the invalidation section setting process of step S1002 in FIG. 12.

The process illustrated in FIG. 13 differs from the process illustrated in FIG. 4 in that the processes of step S408 and step S410 are replaced with the processes of step S1108 and step S1110, respectively, and the process of step S406 is eliminated. The other processes are the same, and thus explanation thereof is omitted.

In step S1108, the invalidation setting part 102A calculates and sets, based on the detection information (i.e., the lateral distance, that is to say, the detection start distance) from the right rear-side radar 32 obtained at the current cycle, the invalidation section related to the newly detected object to store the calculated and set invalidation time period in the storage part 106A. The detection information from the right rear-side radar 32 obtained at the current cycle corresponds to the detection information when a new object is detected.

The invalidation section starts from the position of the new object when the new object is started to be detected. The invalidation section corresponds to a section in which the moving direction information (i.e., the detection information from the right rear-side radar 32) based on the detection information of the new object is invalidated when the new object exists therein. The invalidation section set by the invalidation setting part 102A is adapted to correspond to the reflection point unstable section described above.

Specifically, the invalidation setting part 102A sets, based on the detection start distance, the invalidation section such that the invalidation section becomes longer as the detection start distance becomes longer. For example, the invalidation setting part 102A sets, based on the following formula, for example, the length of the invalidation section Lm.

$$Lm = W \times \tan \beta \qquad \text{formula (1)}$$

Here, W is a coefficient related to a size of the new object, and an average lateral width of the vehicle (2 m, for example) is used, for example. β is a detection angle of the object, that is to say, the angle between the line L and the longitudinal axis Ce (see FIG. 10A and FIG. 10B), and can be calculated based on the detection information obtained at the current cycle. It is noted that, in the state illustrated in FIG. 10B, the moving direction V0 is not perpendicular to the longitudinal axis Ce, and thus the accuracy of the length of the invalidation section Lm set by the formula above becomes slightly worse than that in the state illustrated in FIG. 10A in which the moving direction V0 is perpendicular to the longitudinal axis Ce. However, the moving direction V0 cannot be calculated at that time point, and thus the formula above is used.

The invalidation setting part 102A sets and stores the invalidation section Lm with the calculated length such that the invalidation section is associated with the object ID related to the newly detected object. In the following, the invalidation section associated with the object ID=i is expressed by "Lmi".

It is noted that the invalidation setting part 102A may use stored information defining the relationship between the detection start distance and the invalidation section to set the invalidation section Lm according to the detection start distance, instead of the setting the invalidation section Lm calculated based on the formula (1). In this case, the stored information is defined in mapped data and stored in advance in the main storage of the processing device 10, as described above with reference to FIG. 5.

In step S1110, the invalidation setting part 102A releases the object ID related to the lost object that is not detected at the current cycle (so that the released object ID becomes available for an object that may be newly detected thereafter), and resets the invalidation flag Fi related to the released object ID to "0". Further, the invalidation setting part 102A resets the invalidation section Lmi related to the released object ID to "null" (i.e., a state in which the invalidation section is not set). It is noted that after the invalidation flag Fi and the invalidation section Lmi have been reset in step S1110, the reset invalidation flag Fi and invalidation section Lmi become available for an object that may be newly detected thereafter.

According to the process illustrated in FIG. 13, the invalidation section can be set according to the distance (i.e., the detection start distance) of the object with respect to the host vehicle at timing when the object is started to be detected by the right rear-side radar 32.

FIG. 14 is a flowchart illustrating an example of the invalidating process of step S1003 in FIG. 12.

The invalidating process illustrated in FIG. 14 differs from that illustrated in FIG. 6 in that the processes in step S502, step S508, step S510, and step S514 are replaced with the processes in step S1203, step S1208, step S1210, and step S1214, respectively, and the process in step S512 is eliminated. The other processes are the same, and thus explanation thereof is omitted.

In step S1203, the invalidating part 103A extracts the object ID for which the invalidation section Lm is set.

In step S1208, the invalidating part 103A reads the invalidation section Lmn related to the Nth object ID (see step S1108) from the storage part 106A.

In step S1210, the invalidating part 103A determines whether the object related to the Nth object ID exists in the invalidation section Lmn related to the Nth object ID. Whether the object related to the Nth object ID exists in the invalidation section Lmn related to the Nth object ID can be determined based on the detection information of the object related to the Nth object ID. For example, the invalidating part 103A determines that the object related to the Nth object ID exists in the invalidation section Lmn, if a change amount in the lateral distance of the object related to the Nth object ID (i.e., a change amount with respect to the lateral distance at a time point when the object related to the Nth object ID is started to be detected) is less than or equal to the length of the invalidation section Lmn. If it is determined that the object related to the Nth object ID exists in the invalidation section Lmn related to the Nth object ID, the process routine goes to step S511, otherwise the process routine goes to step S1214.

In step S1214, the invalidating part 103A sets the invalidation flag Fn related to Nth object ID to "0". As a result of this, with respect to the object whose the object ID is "n", the invalidated state is canceled. Further, the invalidating part 103 resets the invalidation section Lmn related to the Nth object ID to "0".

According to the process illustrated in FIG. 14, with respect to the newly detected object, the invalidation flag Fi can be set to "1", and a state in which the invalidation flag Fi is "1" can be maintained until the object exits the invalidation section. In other words, with respect to the newly detected object, the invalidation flag Fi can be kept at "1" (i.e., the invalidated state in which the moving direction information of the object is invalidated can be maintained) during the period in which the object exists in the invalidation section. Correspondingly, according to the process performed by the object information generating part 104A (the process illustrated in FIG. 7), with respect to the object related to the object ID for which the invalidation flag Fi is "1", the moving direction information is not generated, and thus the moving direction information is generated for only the object related to the object ID for which the invalidation flag Fi is "0". Specifically, with respect to the object related to the object ID for which the invalidation flag Fi is "1", the moving direction is not calculated during the period in which the object exists in the invalidation section, and the moving direction of the object is calculated after the object has exited the invalidation section.

According to the second embodiment, the same effects as the first embodiment described above can be obtained.

It is noted that the second embodiment differs from the first embodiment described above in that the invalidation section is used instead of the invalidation time period, as described above. According to the configuration in which the invalidation time period is used, if the relative speed of the object has changed greatly after the invalidation section has been set, there is a probability of a decreased match between the set invalidation time period and the period in which the object exists in the reflection point unstable section. In contrast, according to the configuration in which the invalidation section is used, such a probability can be reduced. However, to the contrary, according to the configuration in which the invalidation section is used, it becomes necessary to always monitor to determine whether the object exists in the invalidation section, which leads to the increased processing load. According to the configuration in which the invalidation time period is used, because the timer counter Cn can be used to determine whether the invalidation time period is elapsed (step S510), the processing load becomes relatively low.

[Third Embodiment]

Figure 15:
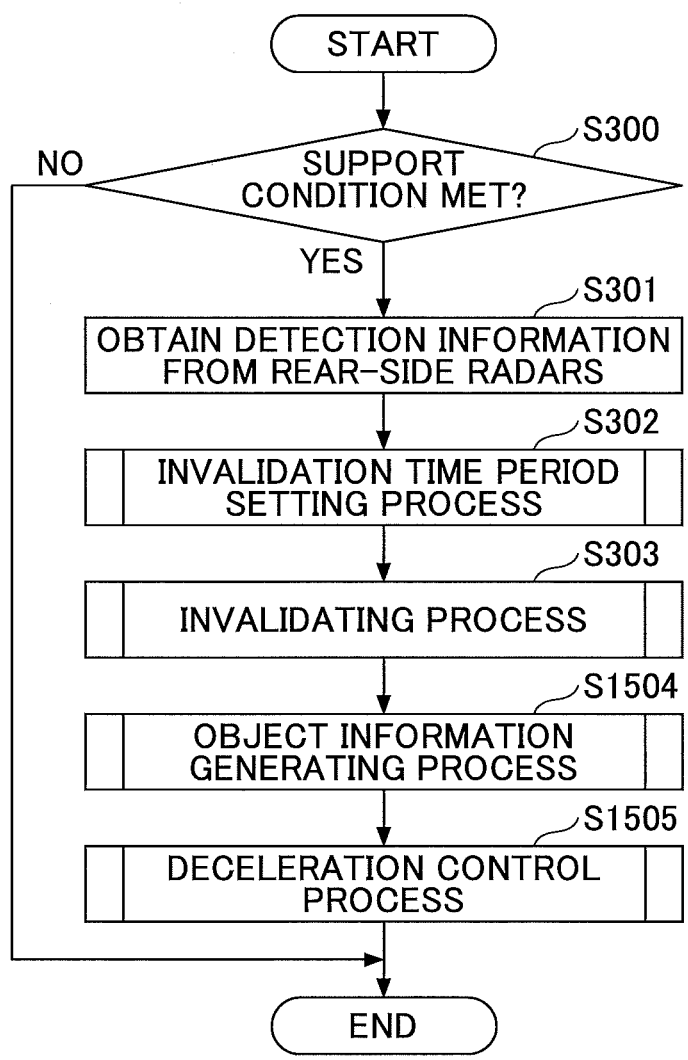
FIG. 15 is a flowchart of an example (third embodiment) of a process executed by a processing device 10B.
Figure 16:
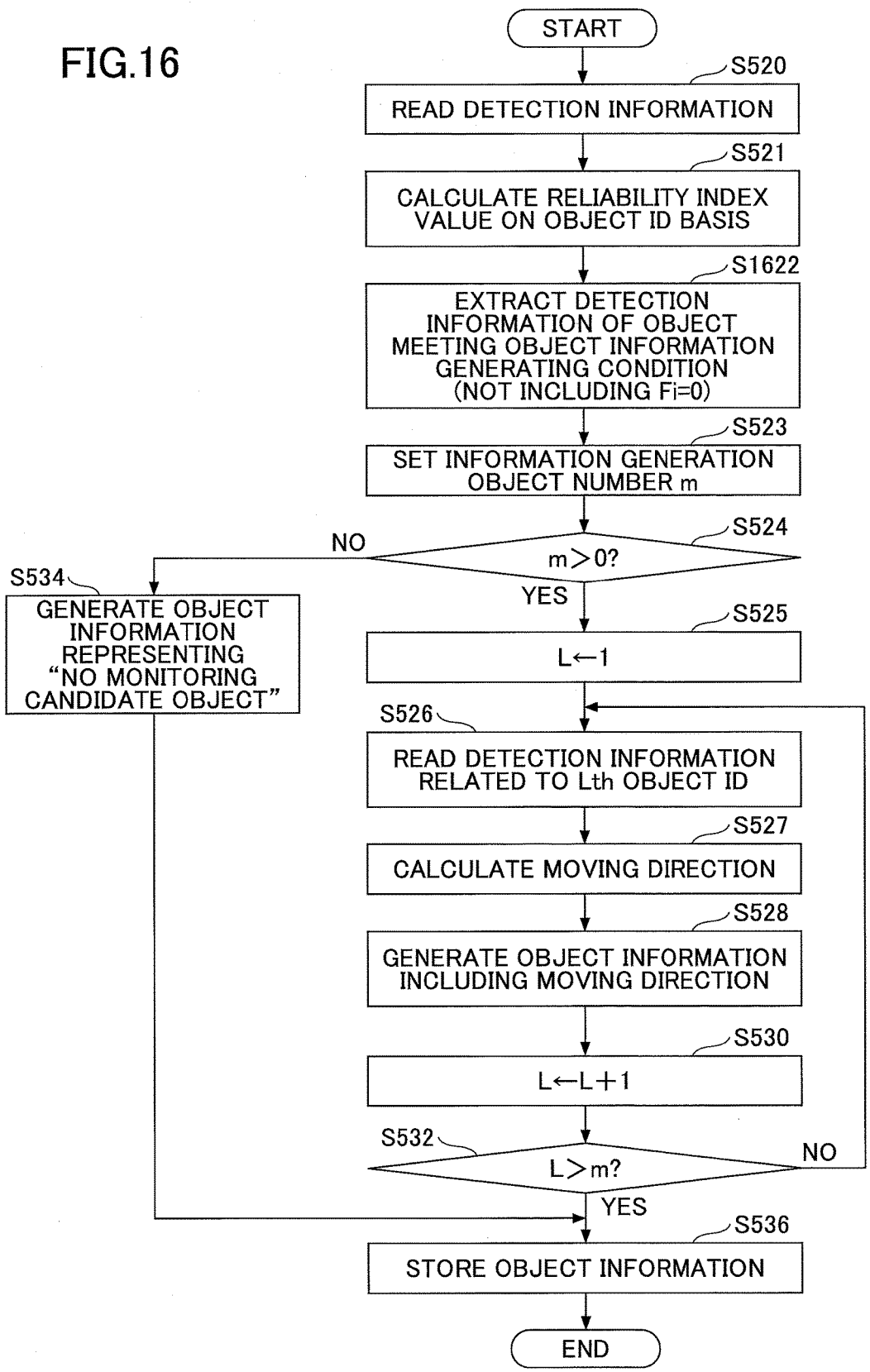
FIG. 16 is a flowchart illustrating an example of an object information generating process of step S1504 in FIG. 15.
Figure 17:
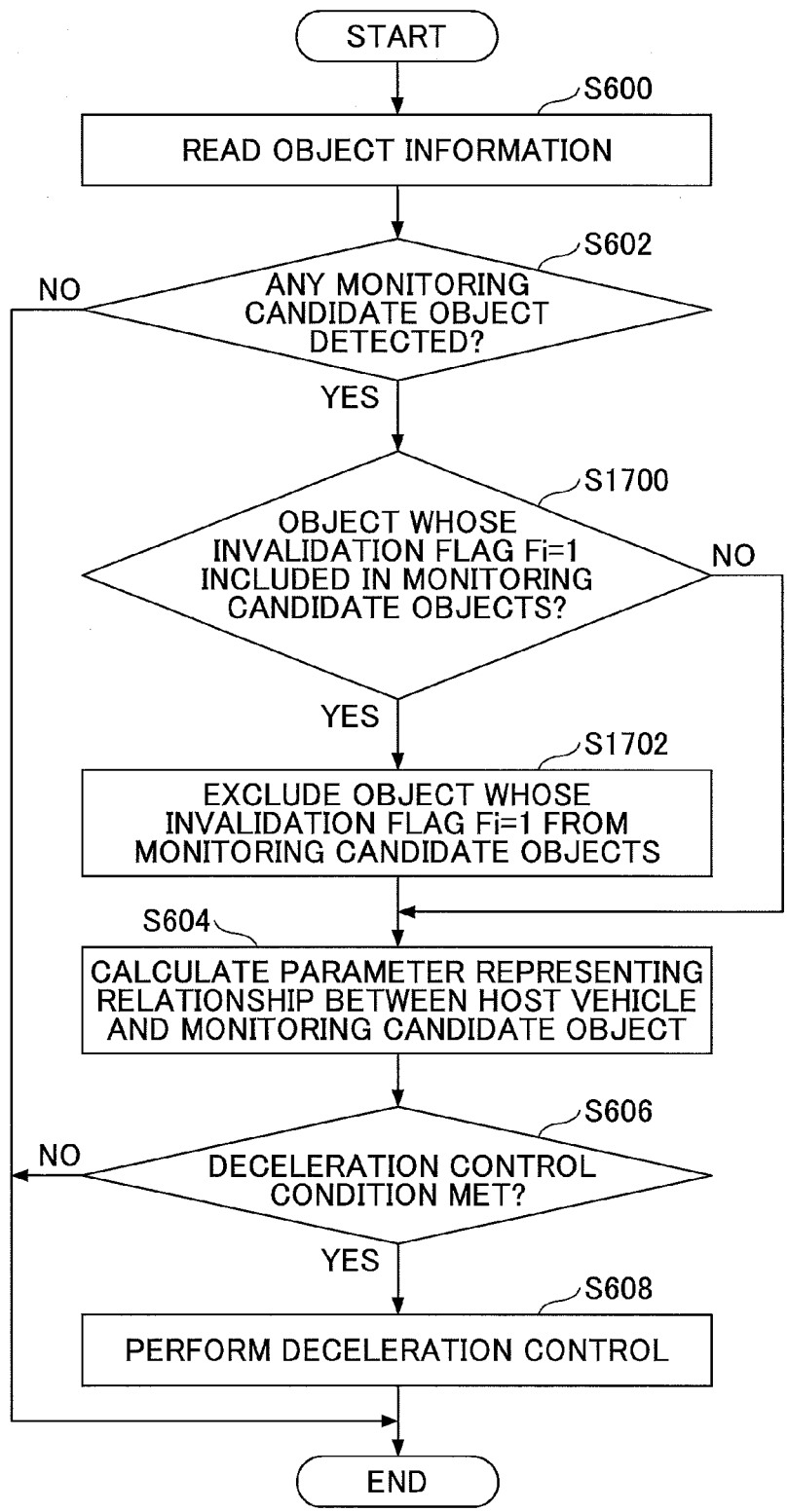
FIG. 17 is a flowchart illustrating an example of a deceleration process of step S1505 in FIG. 15.

Next, with reference to FIGS. 15 through 17, another embodiment (third embodiment) is explained.

The third embodiment differs from the first embodiment described above in that the processing device 10 is replaced with the processing device 10B. The processing device 10B includes a radar information acquisition part 101B, an invalidation setting part 102B, an invalidating part 103B, an object information generating part 104B, a drive support control part 105B, and a storage part 106B. The illustration of the processing device 10B is omitted because it is substantially the same as FIG. 1.

The functions of the radar information acquisition part 101B, the object information generating part 104B, and the drive support control part 105B are the same as those of the corresponding parts, and thus explanation thereof is omitted.

According to the first embodiment, the drive support control based on the object is prevented by preventing the moving direction information of the object from being generated based on the detection information of the right rear-side radar 32 during the invalidation time period. In contrast, according to the third embodiment described hereinafter, the moving direction information of the object is generated based on the detection information of the right rear-side radar 32 during the invalidation time period, but the drive support control based on the moving direction information of the object is prevented during the invalidation time period. Specifically, according to the third embodiment described hereinafter, the process itself of the invalidating part 103B is the same as the process of the invalidating part 103, but the way of using the invalidation flag Fi set by the invalidating part 103B is different.

FIG. 15 is a flowchart of an example (the third embodiment) of a process executed by the processing device 10B. The process illustrated in FIG. 15 is performed every predetermined cycle.

The process illustrated in FIG. 15 differs from the process illustrated in FIG. 3 in that the object information generating process in step S304 is replaced with a object information generating process in step S1504, and the deceleration control process in step S305 is replaced with a deceleration control process in step S1505. The other processes are the same, and thus explanation thereof is omitted.

In step S1504, the object information generating part 104B performs the object information generating process based on the detection information obtained in step S301. The object information generating process is performed to generate the object information used for the deceleration control process described hereinafter, and an example of the object information generating process is described hereinafter.

In step S1505, the drive support control part 105B performs the deceleration control process based on the object information obtained in step S1504. An example of the deceleration control process is described hereinafter.

FIG. 16 is a flowchart illustrating an example of the object information generating process of step S1504 in FIG. 15.

The process illustrated in FIG. 16 differs from the process illustrated in FIG. 7 in that the process of step S522 is replaced with a process of step S1622. The other processes are the same, and thus explanation thereof is omitted.

In step S1622, the object information generating part 104B extracts the detection information of the object that meets a predetermined object information generating condition, among one or more objects related to the detection information obtained at the current cycle from the right rear-side radar 32. According to the third embodiment, the predetermined object information generating condition differs from that according to the first embodiment in that [(11) the invalidation flag Fi is "0"] is not included. Specifically, according to the third embodiment, the predetermined object information generating condition is met when all the conditions (12) through (13) are met, for example.

(12) the reliability index value is "1".
(13) the object is moving in an approaching direction with respect to the vehicle (i.e., there is a probability that the object passes behind the host vehicle in the left and right direction in future).

According to the process illustrated in FIG. 16, unlike the process illustrated in FIG. 7, the object information is generated even with respect to the object of the object ID for which the invalidation flag Fi is "1". Thus, according to the process illustrated in FIG. 16, even with respect to the object of the object ID for which the invalidation flag Fi is "1", the moving direction information of the object is generated based on the detection information related to the object.

FIG. 17 is a flowchart illustrating an example of the deceleration control process of step S1505 in FIG. 15.

The process illustrated in FIG. 17 differs from the process illustrated in FIG. 8 in that a process of step S1700 and a process of step S1702 are added between the process of step S602 and the process of step S604. The other processes are the same, and thus explanation thereof is omitted.

In step S1700, the drive support control part 105B determines whether the object of the object ID for which the invalidation flag Fi is "1" is included in one or more monitoring candidate objects identified in step S602. If it is determined that the object of the object ID for which the invalidation flag Fi is "1" is included in the monitoring candidate objects, the process routine goes to step S1702, otherwise the process routine goes to step S604.

In step S1702, the drive support control part 105B excludes the object of the object ID for which the invalidation flag Fi is "1" from the monitoring candidate objects.

According to the process illustrated in FIG. 17, because the object of the object ID for which the invalidation flag Fi is "1" is excluded from the monitoring candidate objects, the deceleration control is prevented from being performed based on the moving direction information related to the object.

According to the third embodiment, as described above, with respect to the invalidated object (i.e., during the invalidation time period), it becomes possible to prevent the deceleration control from being performed based on moving direction information of the object. As a result of this, the probability that the deceleration control is performed based on the moving direction information of the object with insufficient accuracy is reduced, which increases the reliability of the deceleration control. Further, according to the third embodiment, as is the case with the first embodiment described above, because the invalidation time period is set based on the detection start distance, it becomes possible to adapt the invalidation time period to the period corresponding to the reflection point unstable section with increased accuracy. As a result of this, it becomes possible to reduce the probability that the period during which the deceleration control is prevented is too long or too short. Further, according to the third embodiment, as is the case with the first embodiment described above, the calculation accuracy of the moving direction of the object is improved, which further improves the reliability of the deceleration control using such the calculation result. Further, according to the third embodiment, as is the case with the first embodiment described above, it becomes possible to reduce the probability that the period during which the deceleration control is prevented is too long or too short.

It is noted that, in the third embodiment, as the second embodiment described above, the invalidation section may be used instead of the invalidation time period.

[Alternative Embodiment of Way of Setting Invalidation Time Period]

Figure 18:
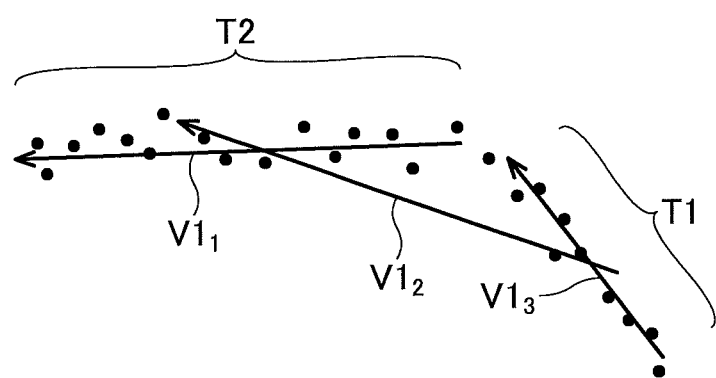
FIG. 18 is a diagram explaining an alternative embodiment of a way of setting the invalidation time period.

Next, with reference to FIG. 18, an alternative embodiment of a way of setting the invalidation time period is described.

FIG. 18 is a diagram explaining the alternative embodiment of a way of setting the invalidation time period.

In FIG. 18, a series of dots representing the position of the object (i.e., the relative position of the object) in time series based on the detection information from the right rear-side radar 32 is schematically illustrated. In the example illustrated in FIG. 18, it is assumed that a section T1 corresponds to the reflection point unstable section (see FIG. 10A, etc.). A section T2 is subsequent to the section T1 and is not the reflection point unstable section.

The moving direction of the object cannot be calculated based on the detection information at a single time point, and thus is calculated based on the detection information at a plurality of time points. Thus, as described above, the moving direction of the object is calculated based on the detection information obtained during a predetermined time period ΔTn (i.e., the detection information at the current cycle and the previous cycles). Samples of the detection information in the predetermined time period ΔTn are extracted for the calculation of the moving direction of the object. Thus, even if the invalidation time period corresponds to the time period corresponding to the section T1 with high accuracy, there is a probability that the object information obtained in the section T1 includes a portion, corresponding to the predetermined time period ΔTn, used for the calculation of the moving direction of the object.

If the detection information related to the object during the invalidation time period is used for the calculation of the moving direction of the object, that is to say, if the detection information obtained from the right rear-side radar 32 in the section T1 is used in addition to the detection information obtained from the right rear-side radar 32 in the section T2, such a moving direction V12 of the object as illustrated in FIG. 18 may be calculated. It is noted that, in FIG. 18, the moving direction V13 of the object calculated based on only the detection information obtained from the right rear-side radar 32 in the section T1, and the moving direction V11 of the object calculated based on only the detection information obtained from the right rear-side radar 32 in the section T2 are conceptually illustrated. The moving direction V12 of the object is more accurate than the moving direction V13 of the object; however, the moving direction V12 of the object is less accurate than the moving direction V11 of the object.

The predetermined time period ΔTn depends on the way of calculating the moving direction of the object or the accuracy to be required; however, if the predetermined time period ΔTn is substantially short, such an decreased accuracy can be neglected. However, if the predetermined time period ΔTn is relatively long or further increased accuracy is required, the alternative embodiment of the way of setting the invalidation time period as described hereinafter may be used.

For example, according to the alternative embodiment, the invalidation time period is corrected such that the invalidation time period becomes longer by the predetermined time period ΔTn. Specifically, if the corrected invalidation time period is expressed by Tm1', Tm1' may be as follows.

$$Tmi'=Tmi+\Delta Tn$$

Alternatively, the invalidation time period may be adapted such that the predetermined time period ΔTn is added in advance. Such an adjustment may be implemented by adapting, based on experiment results, etc., the invalidation time period such that the invalidation time period elapses at timing when the moving direction of the object is started to be calculated with high accuracy, for example.

Alternatively, according to another alternative embodiment, the invalidation time period is adapted without considering the predetermined time period ΔTn, but the moving direction of the object is calculated based on only the detection information of the object obtained after the lapse of the invalidation time period. For example, in the example illustrated in FIG. 18, the invalidation time period elapses (ends) when the object enter the section T2, but only the detection information obtained after the object has entered the section T2 is used for the calculation of the moving direction of the object.

According to such various alternative embodiments, since the invalidation time period is extended, which is slightly disadvantageous in terms of reducing the delay of the timing at which the moving direction of the object becomes available, with respect to the first, second, and third embodiments described above; however, it is advantageous in terms of increasing the accuracy of the calculated moving direction of the object.

The present disclosure is disclosed with reference to the preferred embodiments. However, it should be understood that the present disclosure is not limited to the above-described embodiments, and variations and modifications may be made without departing from the scope of the present disclosure.

For example, according to the first embodiment 1 (this holds true for the second and third embodiments described above), the lateral distance of the object at the time of detecting the vehicle is used as the detection start distance; however, the straight distance between the host vehicle and the object at the time of detecting the vehicle may be used as the detection start distance. This is because the length of the reflection point unstable section is correlated not only to the lateral distance (D2) of the approaching vehicle but also to the straight distance (i.e., the distance D1 of the approaching vehicle), as described above with reference to FIG. 10A, FIG. 10B, FIG. 11A, and FIG. 11B. However, in general, the detection information includes the information of the lateral distance, and thus using the lateral distance is advantageous in terms of reducing the calculation load. Similarly, according to the first embodiment described above, the component of the detection start relative speed in the direction corresponding to the lateral distance (i.e., the direction perpendicular to the longitudinal axis Ce) is used; however, the component of the detection start relative speed in the direction from which the reflection wave comes (i.e., the object distance viewed from the rear-side radars 30) may be used.

Further, according to the first embodiment 1 (this holds true for the second and third embodiments described above), the object information generated in step S304 is used for the deceleration control; however, in addition to or instead of it, the object information generated in step S304 may be used for the alarm control via the alarm apparatus 11. For example, in the process illustrated in FIG. 3, the alarm control process is performed in addition to or instead of the process of step S305. The alarm control process is the same as the deceleration control process illustrated in FIG. 8 except that the process of outputting an alarm instruction is performed instead of the process of step S608. Further, the alarm instruction may be output when an alarm control condition, which is less strict than the predetermined deceleration control condition, is met. Alternatively, an object information generating condition related to the object information used for the alarm control may be less strict than the predetermined object information generating condition (see step S522) related to the object information used for the deceleration control. This is because the deceleration control affects the drivability of the host vehicle and thus is required to be performed with relatively high reliability, while the alarm control does not affect the drivability of the host vehicle and thus increasing the safety by outputting the possibly necessary alarm earlier may be more important than increasing the reliability by preventing the unnecessary alarm. Further, as described above with reference to FIG. 7, the moving direction of the object calculated based on the detection information obtained when the object exists in the reflection point unstable section has a tendency such that there is an error, with respect to the actual moving direction of the object, in the direction toward the host vehicle. This corresponds to the direction in which the predetermined deceleration control condition becomes easier to be met. Thus, the object information generated in step S304 is suited for the deceleration control for which relatively high reliability is required.

Further, according to the first embodiment 1 (this holds true for the second and third embodiments described above), the deceleration control is implemented by applying the brake force to the wheels via the brake control apparatus 13 and reducing the drive force applied to the wheels via the engine control apparatus 12; however, this is not indispensable. The deceleration control may be implemented by one of applying the brake force and reducing the drive force.

Further, according to the first embodiment 1 (this holds true for the second and third embodiments described above), according to the process illustrated in FIG. 8, the monitoring object is only one; however, there are a plurality of monitoring objects at the same time. It is noted that, if the predetermined deceleration control condition is met with respect to the monitoring objects, the drive support control part 105 may perform the deceleration control based on the monitoring object whose probability of the crash with the host vehicle is the highest.

Further, according to the first embodiment 1 (this holds true for the second and third embodiments described above), the predetermined distance Dth is set based on the angle γ between the moving direction of the monitoring object and the moving direction of the host vehicle; however, the predetermined distance Dth may be a fixed value. In this case, the calculation of the angle γ for the calculation of the predetermined distance Dth becomes unnecessary.

It is noted that, the problem described above with reference to FIG. 9, etc., may occur even in a situation where the adjacent shield object does not exist in the detection area of the right rear-side radar 32, if the approaching vehicle appears from the front side of the host vehicle with respect to the line L0 of the right rear-side radar 32. Further, although it depends on the capability of the right rear-side radar 32, there may be a case where it is not possible to distinguish the shield object from a non-shield object such as a gutter cover, for example, with high accuracy based on the detection of the right rear-side radar 32. Thus, according to the embodiments described above, the invalidation is implemented without determining whether there is any shield object shielding the detection wave of the right rear-side radar 32.

However, if it is possible to distinguish the shield object from a non-shield object such as a gutter cover with high accuracy based on the detection of the right rear-side radar 32, such a result of the distinguishing process may be used. Specifically, in the first embodiment 1 (this holds true for the second and third embodiments described above), the invalidation time period may be set only if the shield object, which substantially narrows the detection area R1 by shielding the radio wave from the right rear-side radar 32, is detected. Such a detection of the shield object may be implemented based on detection information from the right rear-side radar 32 and/or the clearance sonars 20, for example. Specifically, during the period in which the shield object is detected based on the detection information from the right rear-side radar 32, the processes of step S406 and step S408 in FIG. 4 are performed, and during the other period, the processes of step S406 and step S408 in FIG. 4 are omitted.

Further, according to the embodiments described above, the rear-side radars 30 include the left and right radar sensors (i.e., the left rear-side radar 31 and the right rear-side radar 32); however, the rear-side radars 30 may three or more radar sensors or only one radar sensor.

Further, according to the embodiments described above, the rear-side radars 30 is used to perform the drive support at the time of the travel of the host vehicle in the back direction; however, it is also possible to use a forward radar sensor to implement a drive support at the time of a travel of the host vehicle in a forward direction by applying the same idea thereto.

What is claimed is:

1. A moving object detection apparatus that is provided on a host vehicle positioned adjacent a shield object, the shield object positioned behind the host vehicle and at a left side thereof or at a right side thereof, the vehicle including a radar sensor on a front or rear portion thereof and a drive support control apparatus configured to perform a drive support control for reducing a probability of a collision between the host vehicle and a monitoring object passing behind the host vehicle from the left side thereof to the right side thereof or from the right side thereof to the left side thereof, the moving object detection apparatus generating, based on detection information of the radar sensor, object information used in the drive support control, the moving object detection apparatus comprising circuitry configured to:

calculate, based on detection information of an object from the radar sensor, a moving direction of the object with respect to the host vehicle to generate the object information, the object information including the information representing the calculated moving direction;

set an invalidation time period or an invalidation section according to a size of a shield range due to the shield object, the invalidation time period is set from a detection start timing when the object is started to be detected by the radar sensor, and the invalidation section is set from a position of the vehicle at the detection start timing such that the invalidation time period and the invalidation section becomes longer when a detection start distance is a first value than when the detection start distance is a second value that is smaller than a first value, the detection start distance corresponding to a distance between the host vehicle and the object at the detection start timing; and prevent a calculation of the moving direction during a period from the detection start timing to an invalidation end timing, the invalidation end timing being at a lapse of the invalidation time period or a timing when the object exits from the invalidation section, or prevent the calculated moving direction from being used as the moving direction of the monitoring object in the drive support control during the period from the detection start timing to the invalidation end timing.

2. The moving object detection apparatus of claim 1, wherein the circuitry sets, based on stored information in which a relationship between a relative speed of the object with respect to the host vehicle at the detection start timing, the detection start distance, and the invalidation time period, the invalidation time period according to the relative speed and the detection start distance based on the detection information from the radar sensor, and the relationship is such that the invalidation time period increases as the detection start distance increases and the invalidation time period increases as the relative speed decreases.

3. The moving object detection apparatus of claim 1, wherein the detection start distance is calculated in a direction perpendicular to a longitudinal axis of the host vehicle.

4. A drive support apparatus that is installed on a host vehicle and performs a drive support control for reducing a probability of a collision between the host vehicle and a monitoring object passing behind the host vehicle from a left side thereof to a right side thereof or from the right side thereof to the left side thereof, the vehicle positioned adjacent a shield object that is positioned behind the host vehicle and at the left side thereof or at the right side thereof, the drive support apparatus comprising:

a radar sensor on a front or rear portion of the host vehicle, and circuitry configured to:

set an invalidation time period or an invalidation section according to a size of a shield range due to the shield object, the invalidation time period is set from a detection start timing when an object is started to be detected by the radar sensor, and the invalidation section is set from a position of the vehicle at the detection start timing such that the invalidation time period and the invalidation section becomes longer when a detection start distance is a first value than when the detection start distance is a second value that is smaller than a first value, the detection start distance corresponding to a distance between the host vehicle and the object at the detection start timing;

calculate, based on detection information of the object from the radar sensor, a moving direction of the object;

perform the drive support control using the calculated moving direction as a moving direction of the monitoring object; and prevent the drive support control using the moving direction of the monitoring object during a period from the detection start timing to an invalidation end timing, the invalidation end timing being at a lapse of the invalidation time period or a timing when the object exits from the invalidation section.

5. The drive support apparatus of claim 4, wherein the drive support control includes at least one of an alarm control that outputs an alarm informing a driver of an approach of the object, and an automatic brake control that automatically applies a brake force to the host vehicle.

* * * * *

UNITED STATES PATENT AND TRADEMARK OFFICE
CERTIFICATE OF CORRECTION

PATENT NO. : 10,197,672 B2
APPLICATION NO. : 15/188563
DATED : February 5, 2019
INVENTOR(S) : Yoshihiko Takahashi, Yoichi Iwata and Motonari Ohbayashi Page 1 of 1

It is certified that error appears in the above-identified patent and that said Letters Patent is hereby corrected as shown below:

In the Specification

In Column 14, Line 42, after "vehicle is", delete "a" and insert --α--, therefor.

Signed and Sealed this
Sixteenth Day of April, 2019

Andrei Iancu
*Director of the United States Patent and Trademark Office*